United States Patent
Ward et al.

(10) Patent No.: US 12,530,538 B2
(45) Date of Patent: Jan. 20, 2026

(54) AUTOMATED METHODS AND SYSTEMS FOR RETRIEVING INFORMATION FROM SCANNED DOCUMENTS

(71) Applicant: VANDERBILT UNIVERSITY, Nashville, TN (US)

(72) Inventors: Michael Ward, Nashville, TN (US); Dax Westerman, Nashville, TN (US); Ruth Reeves, Nashville, TN (US); Jesse Wrenn, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 327 days.

(21) Appl. No.: 18/204,034

(22) Filed: May 31, 2023

(65) Prior Publication Data

US 2023/0385559 A1    Nov. 30, 2023

Related U.S. Application Data

(60) Provisional application No. 63/347,177, filed on May 31, 2022.

(51) Int. Cl.
*G06F 40/40* (2020.01)
*G06V 30/10* (2022.01)
(Continued)

(52) U.S. Cl.
CPC .............. *G06F 40/40* (2020.01); *G06V 30/10* (2022.01); *G06V 30/413* (2022.01); *G06V 30/416* (2022.01); *G16H 10/60* (2018.01)

(58) Field of Classification Search
CPC .... G06F 40/40; G06V 30/12; G06V 30/1444; G06V 30/413; G06V 30/416;
(Continued)

(56) References Cited

U.S. PATENT DOCUMENTS

2011/0249905 A1* 10/2011 Singh .................. G06V 30/412
                                                              382/225
2018/0107801 A1*  4/2018 Guo ..................... G06F 16/9035
(Continued)

OTHER PUBLICATIONS

Kripalani S, LeFevre F, Phillips CO, Williams MV, Basaviah P, Baker DW. Deficits in communication and information transfer between hospital-based and primary care physicians: implications for patient safety and continuity of care. Jama. Feb. 28, 2007;297(8):831-41.

(Continued)

*Primary Examiner* — Yogeshkumar Patel
(74) *Attorney, Agent, or Firm* — Meunier Carlin & Curfman LLC

(57) ABSTRACT

Automated systems and methods for retrieving information from scanned documents are described herein. An example method includes reading a scanned document; and extracting a page image from the scanned document, where the page image includes text and structured data. The method also includes executing a structured data detection algorithm to detect the structured data contained in the page image and identify a plurality of elements of the structured data. Additionally, the method includes performing optical character recognition (OCR) to convert the text contained in the page image to first text data; and performing OCR to convert respective contents of each of the plurality of elements of the structured data to second text data. The method further includes executing a natural language processing (NLP) algorithm to retrieve information from the first and second text data.

16 Claims, 15 Drawing Sheets

(51) Int. Cl.
  *G06V 30/413*  (2022.01)
  *G06V 30/416*  (2022.01)
  *G16H 10/60*  (2018.01)

(58) Field of Classification Search
  CPC .. G06V 30/412; G06V 30/414; G06V 30/418; G06V 30/04; G16H 10/60; G16H 15/00
  See application file for complete search history.

(56) References Cited

U.S. PATENT DOCUMENTS

2021/0366099 A1\* 11/2021 Liao ...................... G06F 40/216
2022/0301670 A1\* 9/2022 Sharma .................. G06F 40/20

OTHER PUBLICATIONS

Wrenn JO, Westerman D, Reeves RM, Ward MJ. 221EMF Development and validation of a text rendering and data retrieval system for extracting clinical information from paper medical records. Annals of Emergency Medicine. Oct. 1, 2020;76(4):S86.

Semler MW, Casey JD, Lloyd BD, Hastings PG, Hays M, Roth M, Stollings J, Brems J, Buell KG, Wang L, Lindsell CJ. Protocol and statistical analysis plan for the Pragmatic Investigation of optimaL Oxygen Targets (PILOT) clinical trial. BMJ open. Oct. 1, 2021;11(10):e052013.

Smith R. An overview of the Tesseract OCR engine. In Ninth international conference on document analysis and recognition (ICDAR 2007) Sep. 23, 2007 (vol. 2, pp. 629-633). IEEE.

National-Archives-and-Records-Administration. The Soundex Indexing System. https://www.archives.gov/research/census/soundex.

Levenshtein VI. Binary Codes Capable of Correcting Deletions, Insertions and Reversals. In: Doklady, editor. Soviet Physics 1966. p. 707.

Bard GV, editor Spelling-error tolerant, order-independent passphrases via the damerau-levenshtein string-edit distance metric. Proceedings of the fifth Australasian symposium on ACSW frontiers 2007: AUS: Australian Computer Society, Inc.

Hamming RW. Error detecting and error correcting codes. The Bell System Technical Journal. 1950;2:147-60.

Soysal E, Wang J, Jiang M, Wu Y, Pakhomov S, Liu H, et al. CLAMP—a toolkit for efficiently building customized clinical natural language processing pipelines. J Am Med Inform Assoc. 2018;25(3):331-6.

Verhagen M, Pustejovsky J. Temporal Processing with the TARSQI Toolkit. In: Coling, editor. Coling 2008; Manchester, UK: Coling 2008 Organizing Committee; 2008. p. 189-92.

Ester M, Kriegel H-P, Sander J, Xu X, editors. A Density-Based Algorithm for Discovering Clusters in Large Spatial Databases with Noise. KDD; 1996.

Getreuer P. A Survey of Gaussian Convolution Algorithms. Image Processing On Line. 2013;3:286-310.

Tesseract, (https://github.com/tesseract-ocr/tesseract).

Niven DJ, Bastos JF, Stelfox HT. Critical care transition programs and the risk of readmission or death after discharge from an ICU: a systematic review and meta-analysis. Crit Care Med. 2014;42(1):179-187.

Sauro KM, Soo A, de Grood C, et al. Adverse Events After Transition From ICU to Hospital Ward: A Multicenter Cohort Study. Crit Care Med. 2020;48(7):946-953.

Horwitz LI, Moriarty JP, Chen C, et al. Quality of discharge practices and patient understanding at an academic medical center. Jama Intern Med. 2013;173(18):1715-1722.

Greenwald JL, Denham CR, Jack BW. The hospital discharge: a review of a high risk care transition with highlights of a reengineered discharge process. Journal of Patient Safety. 2007:97-106.

Department of Veterans Affairs Office of Inspector General. Improvements Needed in Adding Non-VA Medical Records to Veterans' Electronic Health Records. 2019.

Lu LX, Lu SF. Distance, quality, or relationship? Interhospital transfer of heart attack patients. Production and Operations Management. 2018;27(12):2251-2269.

Froehler MT, Saver JL, Zaidat OO, et al. Interhospital Transfer Prior to Thrombectomy is Associated with Delayed Treatment and Worse Outcome in the STRATIS Registry. Circulation. 2017.

McLane P, Tate K, Reid RC, Rowe BH, Estabrooks C, Cummings GG. Addressing Communication Breakdowns during Emergency Care Transitions of Older Adults: Evaluation of a Standardized Inter-Facility Health Care Communication Form. Can J Aging. 2022;41(1):15-25.

Wang TY, Nallamothu BK, Krumholz HM, et al. Association of door-in to door-out time with reperfusion delays and outcomes among patients transferred for primary percutaneous coronary intervention. JAMA. 2011;305(24):2540-2547.

Mueller SK, Fiskio J, Schnipper J. Interhospital Transfer: Transfer Processes and Patient Outcomes. J Hosp Med. 2019;14(8):486-491.

\* cited by examiner

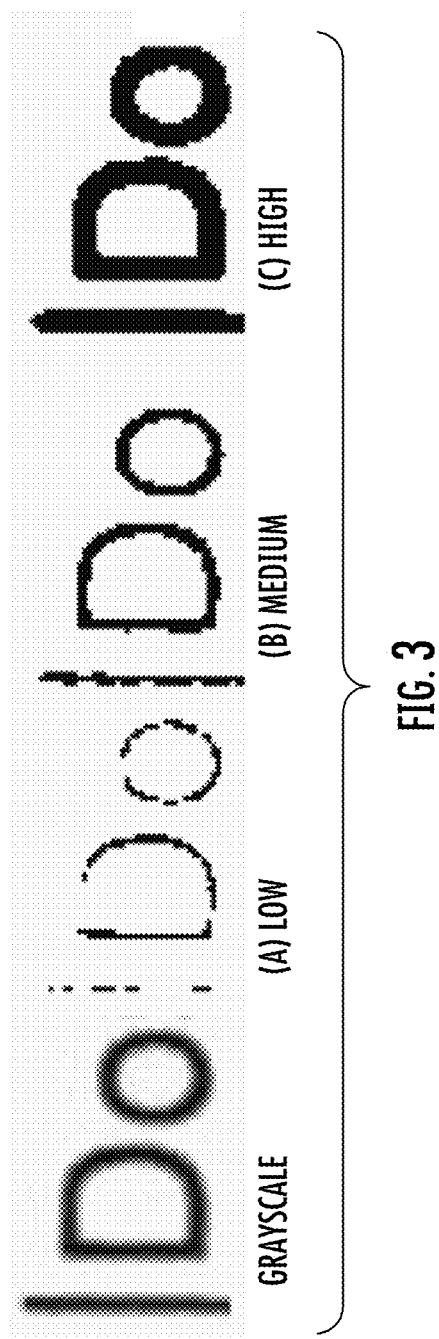
FIG. 3
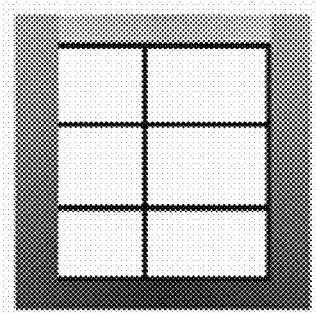
FIG. 4D
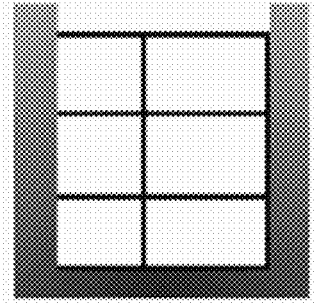
FIG. 4C
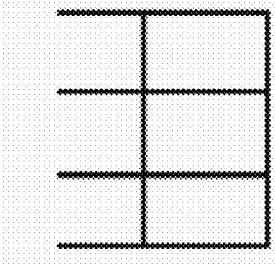
FIG. 4B
FIG. 4A

| | TOTAL ANNOTATED | EXACT MATCHES | PARTIAL MATCHES | EXACT & PARTIAL MATCHES | NO MATCH |
|---|---|---|---|---|---|
| DRUG NAME | 312 | 268 (86%) | 31 (10%) | 299 (96%) | 13 (4%) |
| ADMIN TIME | 251 | 20 (8%) | 210 (84%) | 230 (92%) | 21 (8%) |
| DOSE (NUMBER) | 223 | 190 (85%) | 21 (9%) | 211 (95%) | 12 (5%) |
| DOSE (UNITS) | 225 | 159 (71%) | 46 (20%) | 205 (91%) | 20 (9%) |
| ROUTE | 199 | 91 (46%) | 94 (47%) | 185 (93%) | 14 (7%) |
| FREQUENCY | 119 | 50 (42%) | 38 (32%) | 88 (74%) | 31 (26%) |

FIG. 14

| | PARTIAL MATCHES | MEDIAN LED RATIO | IQR LED RATIO |
|---|---|---|---|
| DRUG NAME | 31 (10%) | 91% | 78%-95% |
| ADMIN TIME | 210 (84%) | 73% | 67%-74% |
| DOSE (NUMBER) | 21 (9%) | 67% | 67%-89% |
| DOSE (UNITS) | 46 (20%) | 80% | 80%-80% |
| ROUTE | 94 (47%) | 82% | 73%-82% |
| FREQUENCY | 38 (32%) | 86% | 67%-89% |

FIG. 15

| RECORD ID | HUMAN REVIEW TIME | MIRROR EHR TIME |
|---|---|---|
| PATIENT 1 (24 PAGES) | 28 MINUTES 26 SECONDS | 1 MINUTES 3 SECONDS |
| PATIENT 2 (51 PAGES) | 34 MINUTES 23 SECONDS | 3 MINUTES |
| PATIENT 3 (21 PAGES) | 15 MINUTES 11 SECONDS | 54 SECONDS |
| PATIENT 4 (25 PAGES) | 18 MINUTES 15 SECONDS | 1 MINUTES 27 SECONDS |
| PATIENT 5 (9 PAGES) | 4 MINUTES 46 SECONDS | 28 SECOND |

FIG. 16

| CLASSIFICATION | PRECISION | ACCURACY |
|---|---|---|
| PATIENT NAME | 1.00 | 1.00 |
| DATE OF BIRTH | 1.00 | 1.00 |
| GENDER | 1.00 | 0.20 |
| RACE | 1.00 | 0.80 |
| MEDICAL RECORD NUMBER | 1.00 | 1.00 |
| CT SCAN PRESENT | 1.00 | 1.00 |
| SUMMARY | 1.00 | 0.83 |

FIG. 17

| | COMPONENTS MATCHED | | | |
|---|---|---|---|---|
| | TOTAL ANNOTATED | EXACT MATCHES | PARTIAL MATCHES | EXACT & PARTIAL MATCHES | UNMATCHED |
| DRUG NAME | 312 | 268 (86%) | 31 (10%) | 299 (96%) | 13 (4%) |
| ADMIN TIME | 251 | 20 (8%) | 210 (84%) | 230 (92%) | 21 (8%) |
| DOSE (NUMBER) | 223 | 190 (85%) | 21 (9%) | 211 (95%) | 12 (5%) |
| DOSE (UNITS) | 225 | 159 (71%) | 46 (20%) | 205 (91%) | 20 (9%) |
| DOSE (ROUTE) | 199 | 91 (46%) | 94 (47%) | 185 (93%) | 14 (7%) |
| DOSE (FREQUENCY) | 119 | 50 (42%) | 38 (32%) | 88 (74%) | 31 (26%) |

FIG. 18

| ELEMENT | PRECISION | RECALL | F-MEASURE |
|---|---|---|---|
| DRUG TO ADMIN TIME LINKAGE | 0.87 | 0.78 | 0.82 |
| DRUG TO ADMIN DOSE LINKAGE | 0.86 | 0.77 | 0.81 |

FIG. 19

|  | MEDICATION NAME | MEDICATION ADMINISTRATION TIME |
| --- | --- | --- |
| TOTAL ANNOTATED | 312 | 251 |
| EXACT MATCHES | 268 (86%) | 20 (8%) |
| PARTIAL MATCHES | 31 (10%) | 210 (84%) |
| EXACT & PARTIAL MATCHES | 299 (96%) | 230 (92%) |
| UNMATCHED | 13 (4%) | 21 (8%) |

FIG. 20

AUTOMATED METHODS AND SYSTEMS FOR RETRIEVING INFORMATION FROM SCANNED DOCUMENTS

CROSS-REFERENCE TO RELATED APPLICATIONS

This application claims the benefit of U.S. provisional patent application No. 63/347,177, filed on May 31, 2022, and titled "AUTOMATED METHODS AND SYSTEMS FOR RETRIEVING INFORMATION FROM SCANNED DOCUMENTS," the disclosure of which is expressly incorporated herein by reference in its entirety.

BACKGROUND

Despite the existence of the nearly $40 Billion Electronic Health Record (EHR) industry in storing electronic health records, paper records remain a mainstay of communication between non-cooperating healthcare systems and ancillary services (e.g., laboratories). These include healthcare systems that have no interoperability and must communicate via paper records for each episode of care. For example, in 2021, Vanderbilt University Medical Center (VUMC) scanned over 2 million documents per month into their EHR. Among these, there were 1 million medical records external to VUMC, annually. With an average of 6.6 pages per document and using hospital size and patient volume statistics from the American Hospital Association, it is estimated that between 3 and 5 billion pages of medical records are scanned into EHRs every year, or 255 miles worth of paper. Even in integrated systems like the Veterans Health Administration (VHA), this is a widespread problem. To enhance access to care, Congress passed the MISSION Act in 2018 to pay for Veteran care outside of the VHA. In Fiscal Year 2021, the VHA paid nearly $18 Billion for Veterans to access non-VHA care. Unfortunately, the primary mechanism to communicate about the care provided is through paper clinical documentation that is then scanned into the VHA's EHR.

The major challenge is that all of this paper is stored as electronic images and the data within these images is rendered nearly unusable for clinical care, administration, and research unless manually reviewed. Regional information exchanges and EHR-specific information exchanges (e.g., Care Everywhere) are incomplete and/or prevent the use of data for operational and research needs (e.g., clinical decision support) further precluding the use by analytical approaches (e.g., natural language processing [NLP], machine learning etc.). Thus, the integration of external data into a hospital system's EHR remains a major challenge and is extraordinarily common. The preparation and communication of EHRs stored as images for use by advanced analytical methods would represent a major advancement allowing clinicians, researchers, and operational leaders the opportunity to take advantage of the electronic data collected in non-native healthcare systems.

SUMMARY

An example computer-implemented method for retrieving information from scanned documents is described herein. The method includes reading a scanned document; and extracting a page image from the scanned document, where the page image includes text and structured data. The method also includes executing a structured data detection algorithm to detect the structured data contained in the page image and identifying a plurality of elements of the structured data. Additionally, the method includes performing optical character recognition (OCR) to convert the text contained in the page image to first text data; and performing OCR to convert respective contents of each of the plurality of elements of the structured data to second text data. The method further includes executing a natural language processing (NLP) algorithm to retrieve information from the first and second text data.

In some aspects, the method further includes storing the first text data, the second text data, and/or the retrieved information in a database.

In some aspects, the method further includes generating graphical display data including the first and second text data, wherein the retrieved information is highlighted within the first and second text data.

In some aspects, the method further includes generating a message including the retrieved information.

In some aspects, the step of executing a structured data detection algorithm includes: performing cell boundary detection to identify a plurality of cells within the structured data; performing table boundary detection to identify one or more tables within the structured data, wherein each of the one or more tables includes one or more of the plurality of cells; and performing table structure detection to identify a plurality of rows and columns within each of the one or more tables.

In some aspects, the step of performing cell boundary detection includes: transforming the page image to a black and white image; detecting a white background within the structured data using a pixel flood process; and detecting one or more lines bounding the plurality of cells.

In some aspects, the step of performing table boundary detection includes: clustering the plurality of cells into the one or more tables, wherein the plurality of cells are clustered based on respective distances between cells; and detecting one or more lines bounding each of the one or more tables.

In some aspects, the step of performing table structure detection includes iterating through the plurality of cells of the one or more tables to assign each cell to a respective row and a respective column in a respective table.

In some aspects, the step of executing a natural language processing (NLP) algorithm includes executing a plurality of NLP algorithms to retrieve information from the first and second text data. For example, the plurality of NLP algorithms can include a first NLP algorithm configured to recognize and encode clinical information contained in the first and second text data and a second NLP algorithm configured to extract temporal information contained in the first and second text data. Optionally, the second NLP algorithm is configured to extract temporal information related to the clinical information recognized and encoded by the first NLP algorithm.

In some aspects, the scanned document is a medical record. In some aspects, the retrieved information includes demographic information and clinical information. For example, the demographic information and clinical information can include an antibiotic and/or induction agent administered to a patient and associated attributes. Alternatively, in some aspects, the medical record is a bone density report, and wherein the retrieved information includes bone density scores and associated attributes.

An example system for detecting structured data in a scanned document is described herein. In some aspects, the system includes: a processor; and a memory operably coupled to the processor, the memory having computer-executable instructions stored thereon that when executed by the processor, cause the processor to: read a scanned document; extract a page image from the scanned document, wherein the page image includes text and structured data; convert, using an optical character recognition (OCR) module, the text contained in the page image to first text data; detect, using a structured data detection module, the structured data contained in the page image; identify, using the structured data detection module, a plurality of elements of the structured data; convert, using the OCR module, respective contents of each of the plurality of elements of the structured data to second text data; and retrieve, using a natural language processing (NLP) module, information from the first and second text data.

Another example computer-implemented method for detecting structured data in a scanned document is described herein. The method includes reading a scanned document; and extracting a page image from the scanned document, where the page image includes text and structured data. The method also includes performing cell boundary detection to identify a plurality of cells within the structured data; performing table boundary detection to identify one or more tables within the structured data, where each of the one or more tables includes one or more of the plurality of cells; and performing table structure detection to identify a plurality of rows and columns within each of the one or more tables.

Yet another example computer-implemented method for detecting structured data in a scanned document is described herein. The method includes reading a scanned document; and extracting a page image from the scanned document, where the page image includes text and structured data. The method also includes executing a structured data detection algorithm to detect the structured data contained in the page image and identify a plurality of elements of the structured data. Additionally, the method includes performing optical character recognition (OCR) to convert the text contained in the page image to first text data; and performing OCR to convert respective contents of each of the plurality of elements of the structured data to second text data.

In some aspects, the step of performing cell boundary detection includes: transforming the page image to a black and white image; detecting a white background within the structured data using a pixel flood process; and detecting one or more lines bounding the plurality of cells.

In some aspects, the step of performing table boundary detection includes: clustering the plurality of cells into the one or more tables, wherein the plurality of cells are clustered based on respective distances between cells; and detecting one or more lines bounding each of the one or more tables.

In some aspects, the step of performing table structure detection includes iterating through the plurality of cells of the one or more tables to assign each cell to a respective row and a respective column in a respective table.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 illustrates a greyscale image transformed to black and white with (a) low, (b) medium and (c) high threshold values for coloring a pixel white.

FIGS. 4A-4D illustrate an image to be analyzed (FIG. 4A) is flooded from the left (FIG. 4B), then right (FIG. 4C), then from a set of remaining white pixels (FIG. 4D) to find table cells.

FIG. 14 is a table showing performance of a tool to identify induction agents, as well as administration time, dose, units, route, and frequency according to an example described below.

FIG. 15 is a table showing the number and percent of total annotated records that were partial matches, as well as the median and IQR of their Levenshtein Edit Distance (LED) Ratios according to an example described below.

FIG. 16 is a table showing the time per record for Human Review vs. MIRROR EHR processing according to an example described below.

FIG. 17 is a table showing the Classification Results; Record Level according to an example described below.

FIG. 18 is a table showing MIRROR's optical character recognition (OCR) performance by match criteria according to an example described below.

FIG. 19 is a table showing MIRROR's natural language processing (NLP) performance according to an example described below.

FIG. 20 is a table showing MIRROR's performance on clinical data according to an example described below.

DETAILED DESCRIPTION

Figure 1:
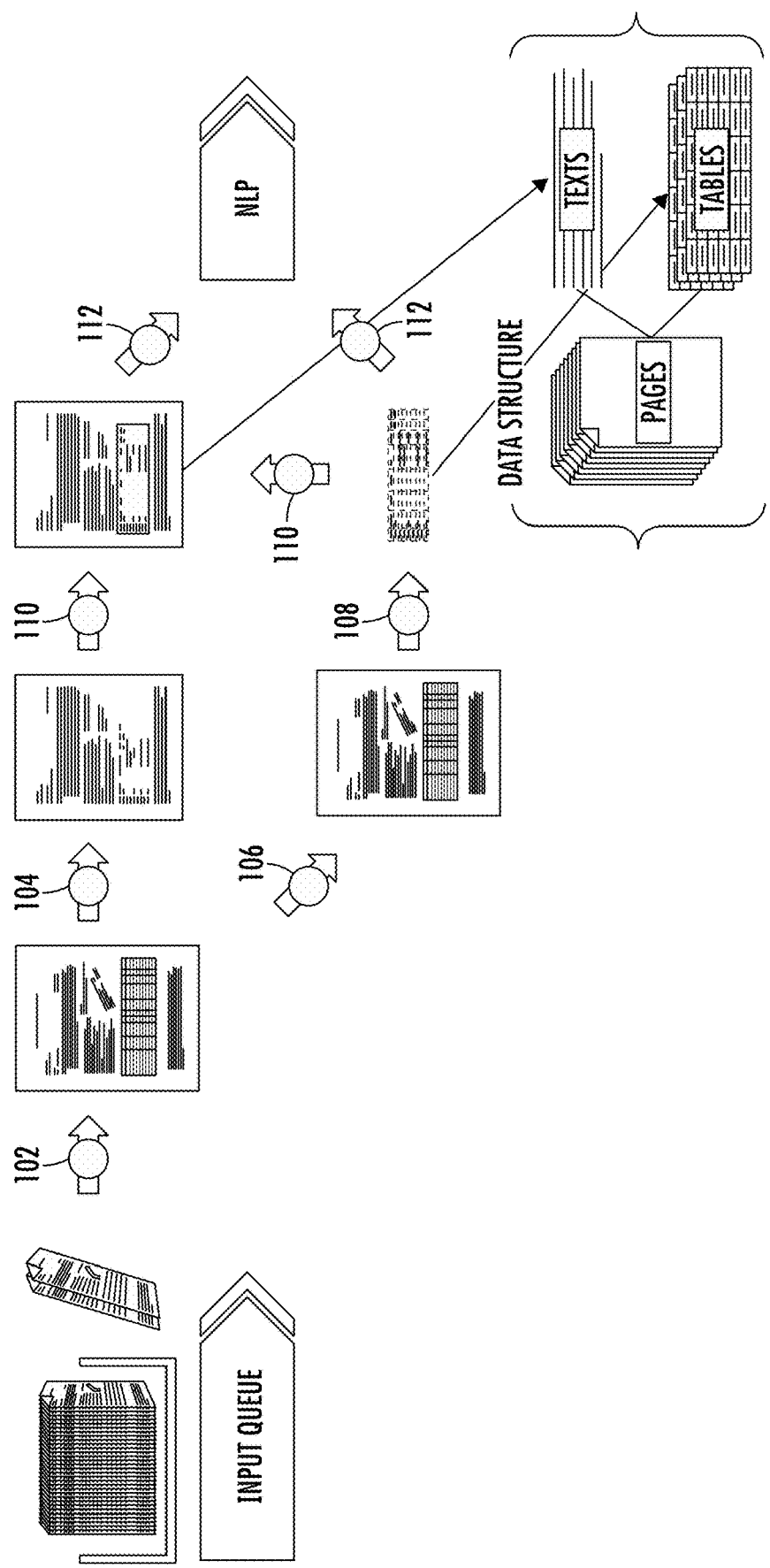
FIG. 1 is a flow diagram illustrating a Medical Information Retrieval Representing Optically Recognized (MIRROR)-EHR engine according to an example implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising", and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for applications where the scanned documents are medical records, it will become evident to those skilled in the art that the implementations are not limited thereto but are applicable for other types of scanned documents.

As used herein, the terms "about" or "approximately" when referring to a measurable value such as an amount, a percentage, and the like, is meant to encompass variations of ±20%, ±10%, ±5%, or ±1% from the measurable value.

As described herein, scanned documents (i.e., paper records in electronic form) are common in many applications including medical records. While scanned documents are stored electronically and can therefore be shared/accessed easily, scanned documents may be unusable without manual curation in many applications. For example, scanned documents present challenges for existing OCR and NLP algorithms, which would otherwise facilitate automation. One such challenge is the presence of structured data (e.g., tables) within scanned documents. Structured data is common in medical records and often contains important, relevant information for clinical, administrative, and/or research applications. Unfortunately, structured data is not easily processed by OCR algorithms and therefore information contained therein may not by processed by OCR algorithms and/or NLP algorithms. The systems and methods described herein provide a solution to technical challenges presented by scanned documents. For example, the systems and methods described herein implement techniques for detecting structured data, including but not limited to, techniques for detecting cell and table boundaries and techniques for detecting tables within structured data. Once detected, the information contained in such detected structured data can be processed by OCR and NLP algorithms.

Example Methods for Automated Information Retrieval from Scanned Documents

Figure 2:
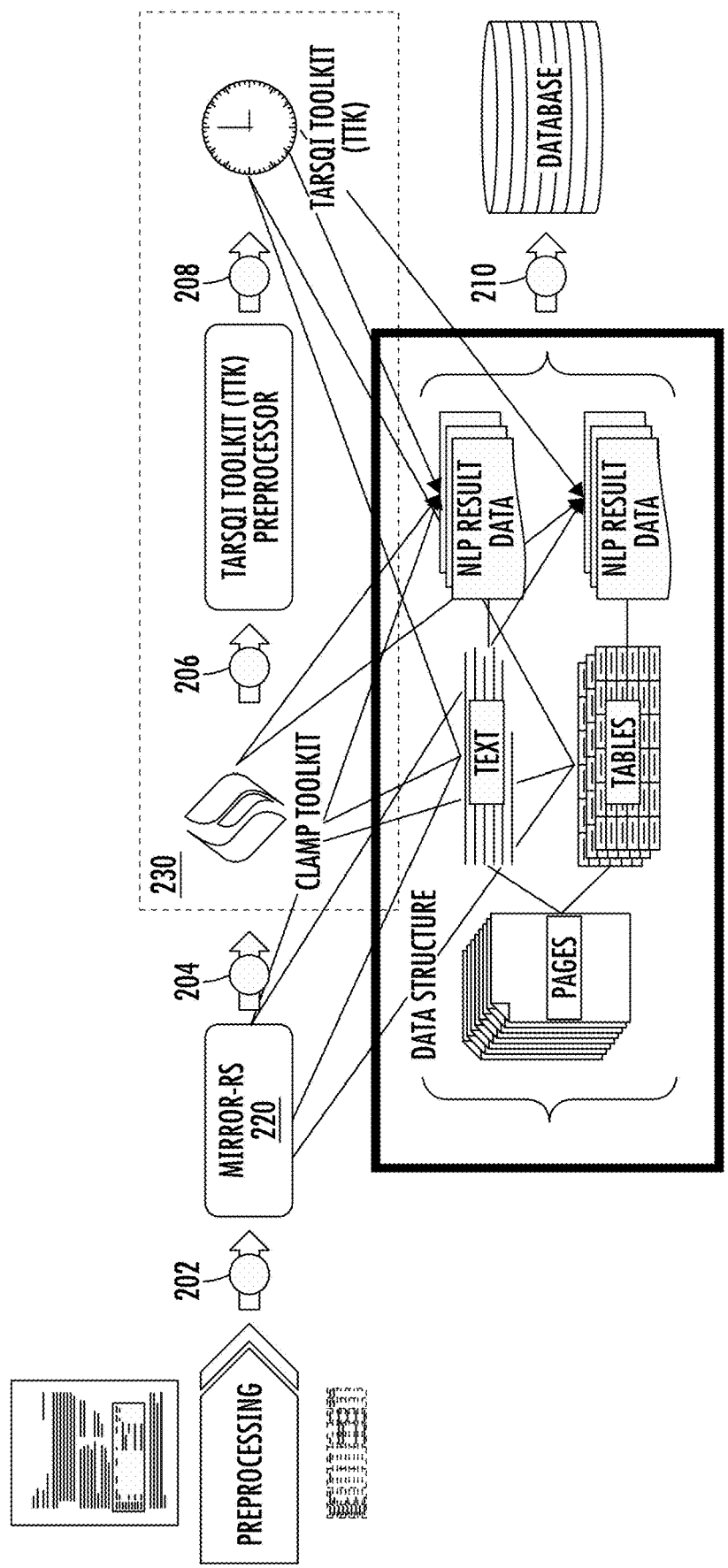
FIG. 2 is a flow diagram illustrating a MIRROR-EHR module pipeline according to an example implementation described herein.

Referring now to FIGS. 1 and 2, an example method for retrieving information from scanned documents is shown. This disclosure contemplates that the operations of FIGS. 1 and 2 can be performed using a computing device such as the computing device shown in FIG. 7. It should be understood that FIGS. 1 and 2 can optionally be performed using a plurality of computing devices. As shown in FIG. 1, a scanned document is read, and a page image is extracted from the scanned document at step 102. This disclosure contemplates that the scanned document may be read from a repository, storage medium, digital source, or other source of scanned documents. Additionally, in some implementations, the source for scanned documents can optionally be operational (e.g., direct scan) or research-level (e.g., flat-file archive) sources. It should be understood that pages are extracted one-by-one for further processing as described below. The page image includes text and structured data. As used herein, 'text' refers to narrative text and 'structured data' refers to data in a structured format. For example, as described in the examples herein, the structured data is a table (or tables) with rows and columns. It should be understood that tables are only provided as example structured data. Additionally, in the examples herein, the scanned document is in a portable document format (PDF) file format. It should be understood that PDF is only provided as an example file format. This disclosure contemplates that the scanned document may be in different file formats, which include but are not limited to tag image file format (TIFF). Additionally, the scanned document is optionally a medical record. It should be understood that medical records are provided only as examples. This disclosure contemplates that the systems and methods described herein may be used to automatically retrieve information from other types of documents.

At step 104, optical character recognition (OCR) is performed to convert the text contained in the page image to first text data. At step 106, a structured data detection algorithm is performed to detect the structured data contained in the page image and identify a plurality of elements of the structured data. An example structured data detection method is described in further detail below with regard to FIGS. 3-6B and 11-13. Thereafter, at step 108, OCR is performed to convert respective contents of each of the plurality of elements of the structured data to second text data. For example, when the structured data is a table, OCR is performed to convert respective contents of each cell (e.g., respective contents located at intersection of row and column) of the table to second text data. Performing OCR on structured data is a difficult task. Medical records oftentimes include structured data such as tables, making such documents challenging for automated processing (e.g., see Examples 1-7). Accordingly, the structured data detection algorithm is performed at step 106 prior to performing OCR on the structured data at step 108. OCR techniques are known in the art. This disclosure contemplates using known OCR techniques with the systems and methods described herein.

At step 110, the OCR'ed text (i.e., first and second text data) is merged. Thereafter, at step 112, a natural language processing (NLP) algorithm is executed to retrieve information from the first and second text data. As described in the medical record examples provided herein, the retrieved information includes demographic information and clinical information (see e.g., Example 4). For example, the demographic information and clinical information include an antibiotic and/or induction agent administered to a patient and associated attributes (e.g., name, dosage amount, dosage frequency, administration time, etc.) (see e.g., Example 3). Alternatively, the medical record may be a bone density report, and the retrieved information includes bone density scores and associated attributes (see e.g., Example 5).

Referring now to FIG. 2, an OCR-NLP environment can include an OCR module 220 and an NLP module 230. As noted above, this disclosure contemplates that the operations of FIGS. 1 and 2 can be performed using a computing device such as the computing device shown in FIG. 7. It should be understood that FIGS. 1 and 2 can optionally be performed using a plurality of computing devices. In other words, each of the OCR module 220 and NLP module 230 can include computer-readable instructions stored in memory of a computing device. At step 202, a scanned document is read, and a page image is extracted from the scanned document. These operations are described above with regard to FIG. 1, step 102. As described herein, the scanned document may be read from a repository, storage medium, digital source, or other source of scanned documents. Optionally, as shown in FIG. 2, a plurality of NLP algorithms are executed to retrieve information from the first and second text data. For example, at step 204, a first NLP algorithm configured to recognize and encode clinical information contained in the first and second text data is executed. Optionally, the first NLP algorithm is the Clinical Language Annotation, Modeling, and Processing (CLAMP) toolkit. The CLAMP toolkit is software from the Center for Computational Biomedicine at The University of Texas Health Science in Houston, Texas (https://clamp.uth.edu/). It should be understood that the CLAMP toolkit is provided only as an example. This disclosure contemplates using another NLP algorithm capable of recognizing and encoding clinical information in text data. At step 206, the first and second text data is annotated based on the findings for the first NLP algorithm. Thereafter, at step 208, a second NLP algorithm configured to extract temporal information contained in the first and second text data is executed. Optionally, the second NLP algorithm is the Tarsqi Toolkit (UK), which is a set of processing components for extracting temporal information in text data (https://github.com/tarsqi/ttk). It should be understood that the UK is provided only as an example. This disclosure contemplates using another NLP algorithm capable of extracting temporal information from text data. As shown in FIG. 2, the second NLP algorithm is configured to extract temporal information related to the clinical information recognized and encoded by the first NLP algorithm. At step 210, the first text data, the second text data, and/or the retrieved information are stored in a database.

Alternatively or additionally, the method optionally further includes generating graphical display data including the first and second text data, where the retrieved information is highlighted within the first and second text data. Alternatively or additionally, the method optionally further includes generating a message including the retrieved information.

Referring now to FIGS. 3-6B, an example method for structured data detection is shown. As described above, this method can optionally be performed at step 106 in the process illustrated by FIG. 1. The algorithm is based on, but a significant modification of, the watershed segmentation algorithm. Watershed uses image morphology to identify contiguous regions, requiring a seed point within each region and classifying the background as a separate object. In the method described herein, a modified flood on the background is initially seeded and performed, then iterated over the document, seeding throughout and flooding areas that have not yet been accessed by prior floods. In particular, the example structured data detection method can include performing cell boundary detection to identify a plurality of cells within the structured data; performing table boundary detection to identify one or more tables within the structured data, where each of the one or more tables includes one or more of the plurality of cells; and performing table structure detection to identify a plurality of rows and columns within each of the one or more tables.

The step of performing cell boundary detection includes transforming the page image to a black and white image; detecting a white background within the structured data using a pixel flood process; and detecting one or more lines bounding the plurality of cells. For example, with reference to FIGS. 3-5, structured tabular data were identified within pictures of documents. In an example dataset, tabular data may be consistently set on a light background and surrounded by an unbroken dark line delineating a table from its surroundings and each component cell from its neighbors. The method takes a single image of a scanned document as input. This image may or may not contain tabular data. The image is first transformed into black and white. To do so, first the image is transformed to grayscale (done automatically by most non-color scanners), then a threshold brightness is set above which each pixel in the image is set to white, and otherwise set to black. Manipulation of this threshold results in thicker characters and lines if the threshold is higher and thinner if lower (FIG. 3). Choice of a higher threshold creates thicker characters and lines, thus improving the chance that the lines that bound tabular data will be unbroken.

In order to identify the best threshold value, values were tested by 10 s between 0 (min) to 256 (max) using the annotated validation set, and precision and recall were reported for each threshold value. Following transformation to black-and-white, the image is pre-processed to turn any pixel black that has two black horizontal neighboring pixels or two black vertical neighboring pixels. A threshold of 170 results in the best f-measure of approximately 0.92.

The next step of the algorithm involves detecting the background that bounds any tabular data. A background is defined as the set of white pixels contiguous with the edges of the image. In order to detect the background, first two pixels are assigned on the right and left edge of the image as starting points for a pixel flood. The left starting point is on the left edge of the image, halfway down the image (x=0, y=0.5×image height). The right starting point is on the right edge of the image, halfway down the image (x=image width, y=0.5×image height).

A pixel flood is performed by setting the initial pixel to black, then recursively setting all white pixels that touch any of the set of flooding pixels to black. This has the effect of turning an entire white space black without crossing unbroken black walls. In the context of the algorithm, it has the effect of turning the entire image black with the exception of areas in the image that are fully bounded by unbroken lines of black pixels, which are referred to as walls.

It was found that many of the tables in the training dataset did not have either upper or lower boundaries due to page breaks (FIG. 4A), therefore the flood algorithm was altered to set constraints on direction of flood. Specifically, in the top fifth of an image, an upper boundary was imposed where a table might not have an upper boundary. Beyond the upper boundary, the flood is not allowed to travel down—it may travel left, right, and up (FIG. 4B). The process is then repeated to complete the flooding of all background sides (FIG. 4C). In the bottom fifth of an image where a table might not have a lower boundary, the flood is not allowed to travel up.

Figure 5:
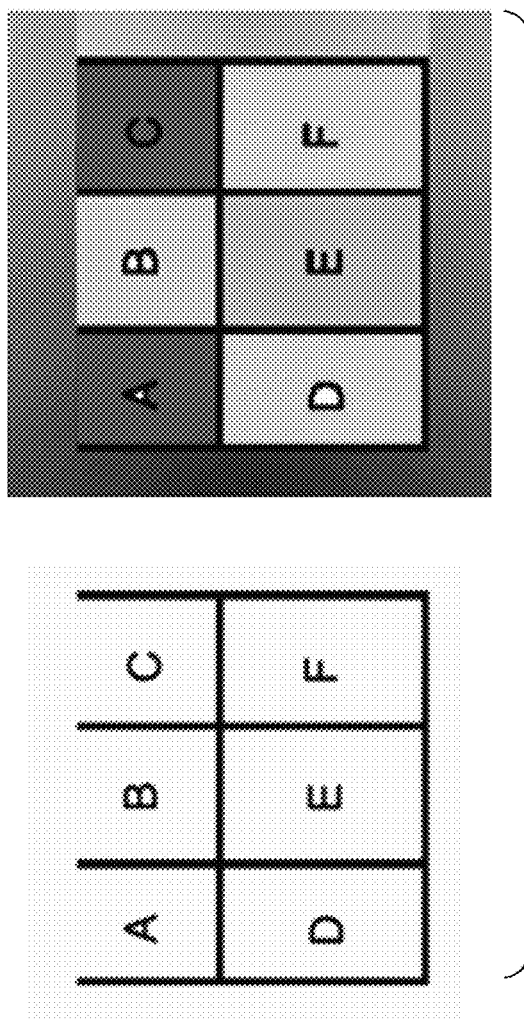
FIG. 5 illustrates an example table detection algorithm output with 6 detected cells, ignoring typographic counters.

At this point, the background of the image has been colored black, and those areas that are bound by walls remain unchanged. The algorithm then iterates over the pixels of the image, and each time a white pixel is identified, a new unconstrained flood is started from that pixel (FIG. 4D). The coordinates of the pixels in all four extremes (topmost, bottommost, leftmost, rightmost) from this finished flood are saved and are used to identify a rectangle that bounds an inner area that was surrounded by a wall. If the size of a rectangle is smaller than a predetermined threshold (2000 pixels), that rectangle is discarded. This is to account for typographic "counters," the area of a letter that is enclosed by that letter, e.g. the circular "hole" inside an O. (FIG. 5). If the width or height of a rectangle is smaller than a predetermined threshold (30 pixels), that rectangle is discarded. Finally, because some flooded areas may not be rectangular and may therefore not represent cells, if the sum of distances between points defined by the four diagonal extremes (upper left-most, lower right-most, etc.) in the flooded area and the diagonal extremes of the bounding rectangle is greater than a predetermined threshold (40 pixels), that rectangle is discarded.

The algorithm continues to iterate over the image, identifying a collection of rectangles, each of which is considered a cell in a table. Output from this first step of the algorithm is an unordered collection of rectangles representing cells. This algorithm is $O(n^2)$ where n=height×width. In other words, this algorithm may iterate over n pixels no more than $n^2$ times. The sub-image inside each rectangle may be submitted to an OCR algorithm to process the text that is contained in each rectangle. Table boundary detection was employed to rebuild the table from its component rectangles.

Additionally, the step of performing table boundary detection includes clustering the plurality of cells into the one or more tables, where the plurality of cells is clustered based on respective distances between cells; and detecting one or more lines bounding each of the one or more tables. For example, to combine cells into tables, a process akin to single-linkage clustering is used. Initially, each cell is assigned to a different cluster. With every step, the two clusters separated by the smallest distance are combined into the same cluster. Distance is defined as the distance between the two closest pixels in a cluster. Clusters continue to combine until either (a) there is only one cluster, or (b) the distance between the two closest clusters is more than a threshold defined in the algorithm.

After clustering, each cluster from the final set is analyzed to identify its boundaries, creating a rectangle that bounds each final cluster. These clusters are identified as separate tables, each containing one or more cells. Algorithm output is an unordered collection of "tables," each of which is defined by a bounding rectangle and a collection of its component cells.

Additionally, the step of performing table structure detection includes iterating through the plurality of cells of the one or more tables to assign each cell to a respective row and a respective column in a respective table. For example, with reference to FIGS. 6A-6B, at this point, each table is defined as a single table-bounding rectangle and a set of rectangles representing cells within that table. Table structure is semantically important, as data within the same row or column are generally related. The algorithm starts by identifying the highest and left-most cell, the index cell, then iterates over cells whose vertical midpoint is between the top and bottom of the index cell. These are added to a collection identified by the index cell. When there are no more qualifying cells, the collection is complete and represents a row in the table. These cells are marked assigned, and the algorithm starts over, identifying a new index cell from the collection of unassigned cells and identifying the collection of cells that "belong to" the new index cell, iteratively identifying all of the table's rows.

Figure 6B:
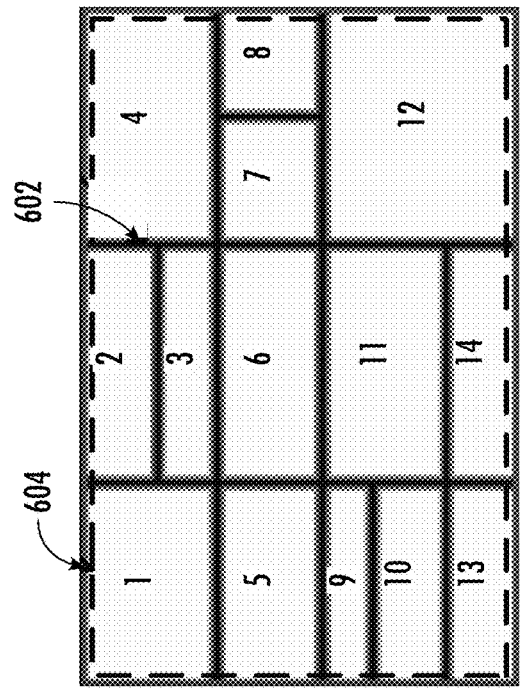
FIG. 6B illustrates detected cells bordered by a thick solid line, detected table bordered by a dashed line.
Figure 6A:
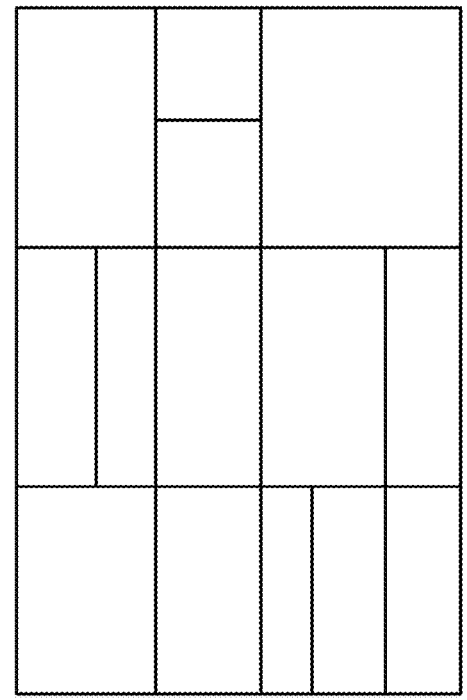
FIG. 6A illustrates an assembly of cells into table structure.

FIG. 6B illustrates the detected cells and the detected table. In FIG. 6B, the detected cells are bordered by a thick solid line, which is highlighted by reference number 602, and the detected table is bordered by a dashed line, which is highlighted by reference number 604. Vertically split cells (FIG. 6B, cells 2 and 3) are identified top to bottom. Horizontally split cells (FIG. 6B, cells 7 and 8) are identified left to right. Assignment of vertically merged cells, or cells belonging to more than one row (FIG. 6B, cells 11, 12), is based on the row to which the merged cell is most closely aligned, however they are not regularly encountered in exemplary datasets. Horizontally merged cells are treated as a single cell and added to the row collection. FIGS. 6A-6B demonstrates the order in which cells are identified, and the algorithm's output is as follows:

ROW 1 (Index Cell 1): [1] [2] [3] [4]
ROW 2 (Index Cell 5): [5] [6] [7] [8]
ROW 3 (Index Cell 9): [9]
ROW 4 (Index Cell 10): [10] [11] [12]
ROW 5 (Index Cell 11): [13] [14]

Figure 7:
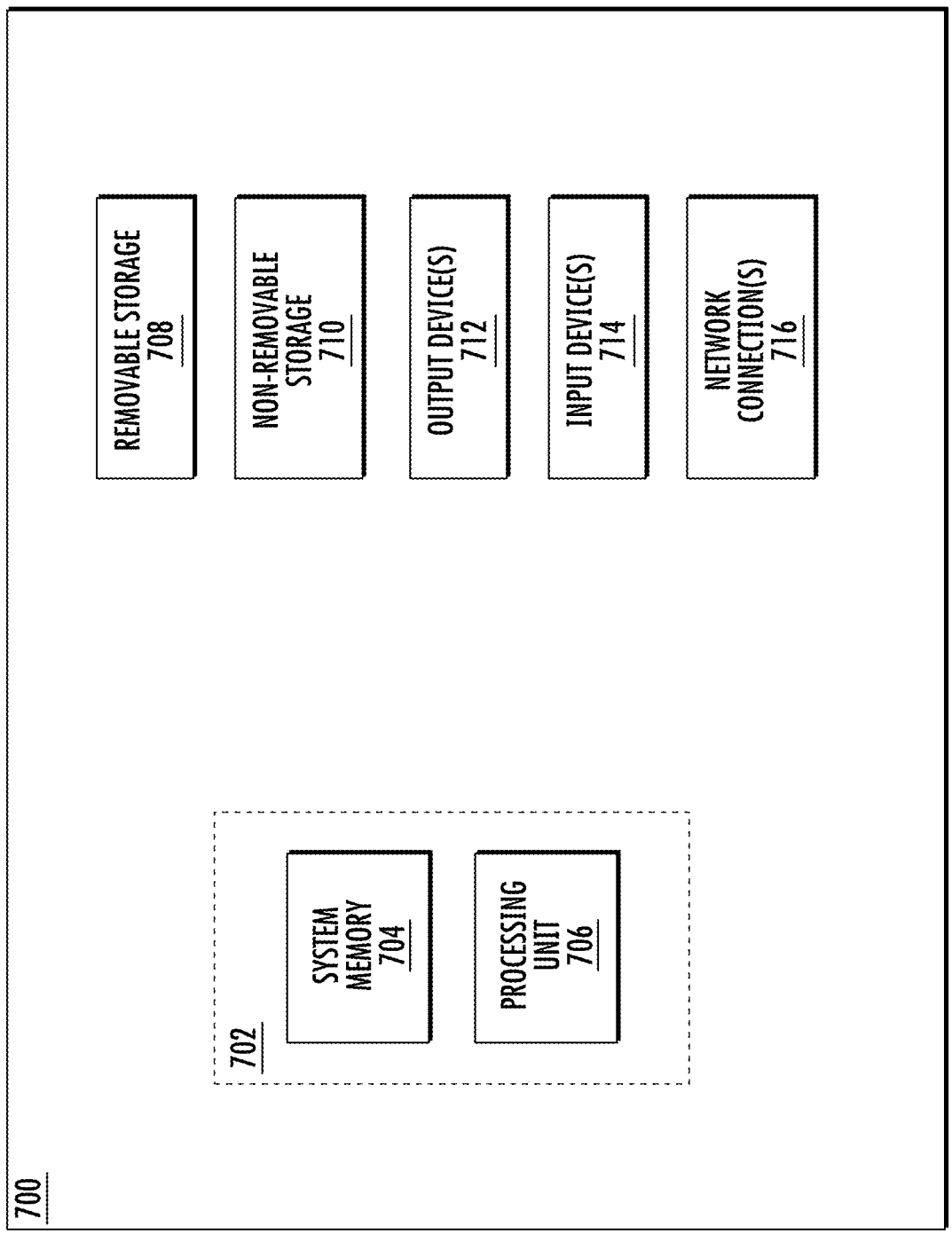
FIG. 7 is an example computing device.
Figure 8:
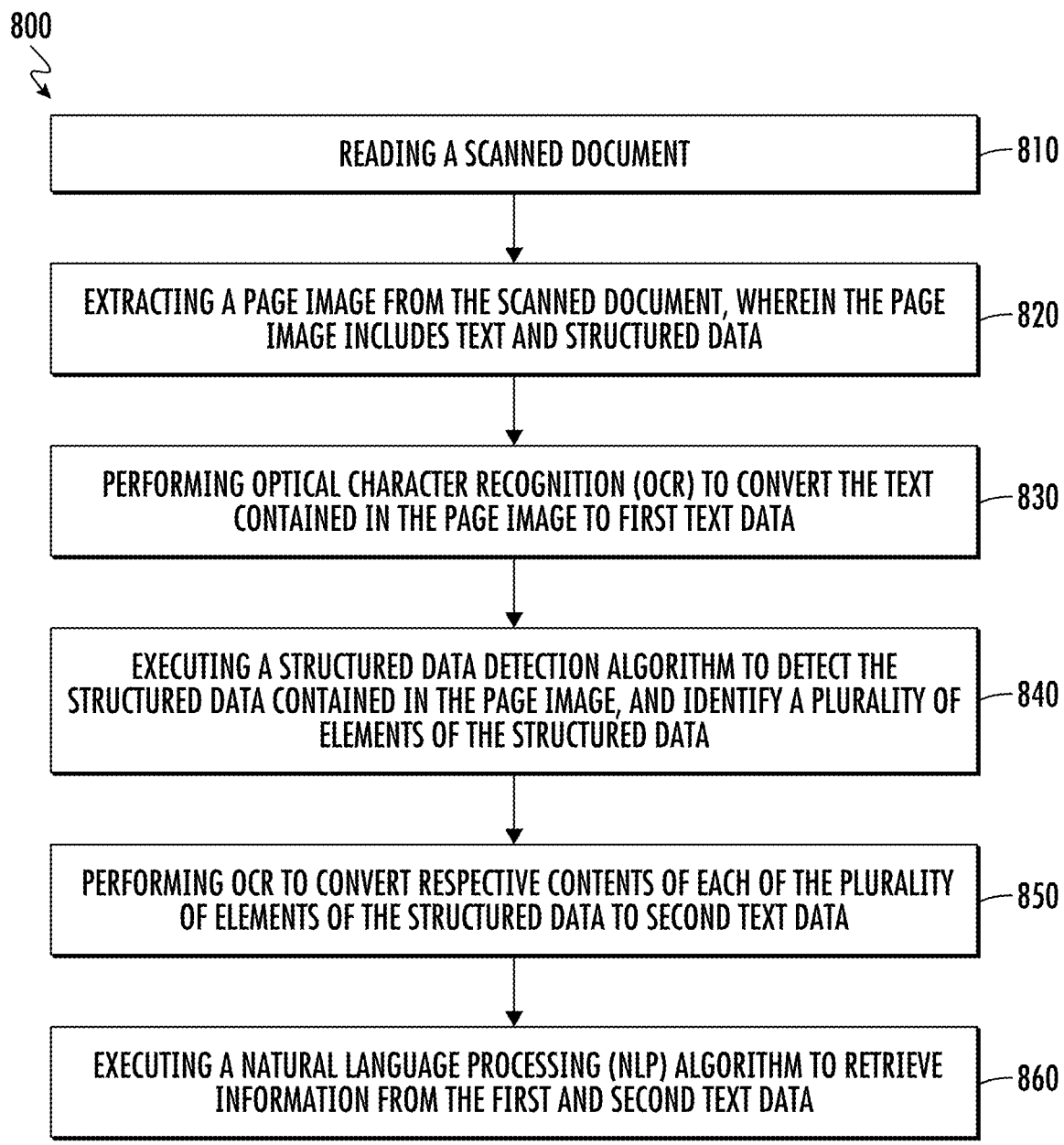
FIG. 8 is a flow diagram illustrating operations for detecting structured data in a scanned document according to an example implementation described herein.

Referring now to FIG. 8, an additional example method 800 for retrieving information from scanned documents is shown. This disclosure contemplates that the operations of FIG. 8 can be performed using a computing device such as the computing device shown in FIG. 7. It should be understood that the operations of FIG. 8 can optionally be performed using a plurality of computing devices. As shown in FIG. 8, a scanned document is read 810, and a page image is extracted from the scanned document at step 820. It should be understood that pages are extracted one-by-one for further processing as already described. At step 830, optical character recognition (OCR) is performed to convert the text contained in the page image to first text data. At step 840, a structured data detection algorithm is performed to detect the structured data contained in the page image and identify a plurality of elements of the structured data. The structured data detection algorithm can optionally include one or more of the operations described with regard to FIGS. 11-13 (e.g., cell boundary detection, table boundary detection, and table detection). Thereafter, at step 850, OCR is performed to convert respective contents of each of the plurality of elements of the structured data to second text data. For example, when the structured data is a table, OCR is performed to convert respective contents of each cell (e.g., respective contents located at intersection of row and column) of the table to second text data. At step 860, a natural language processing (NLP) algorithm is executed to retrieve information from the first and second text data.

Figure 9:
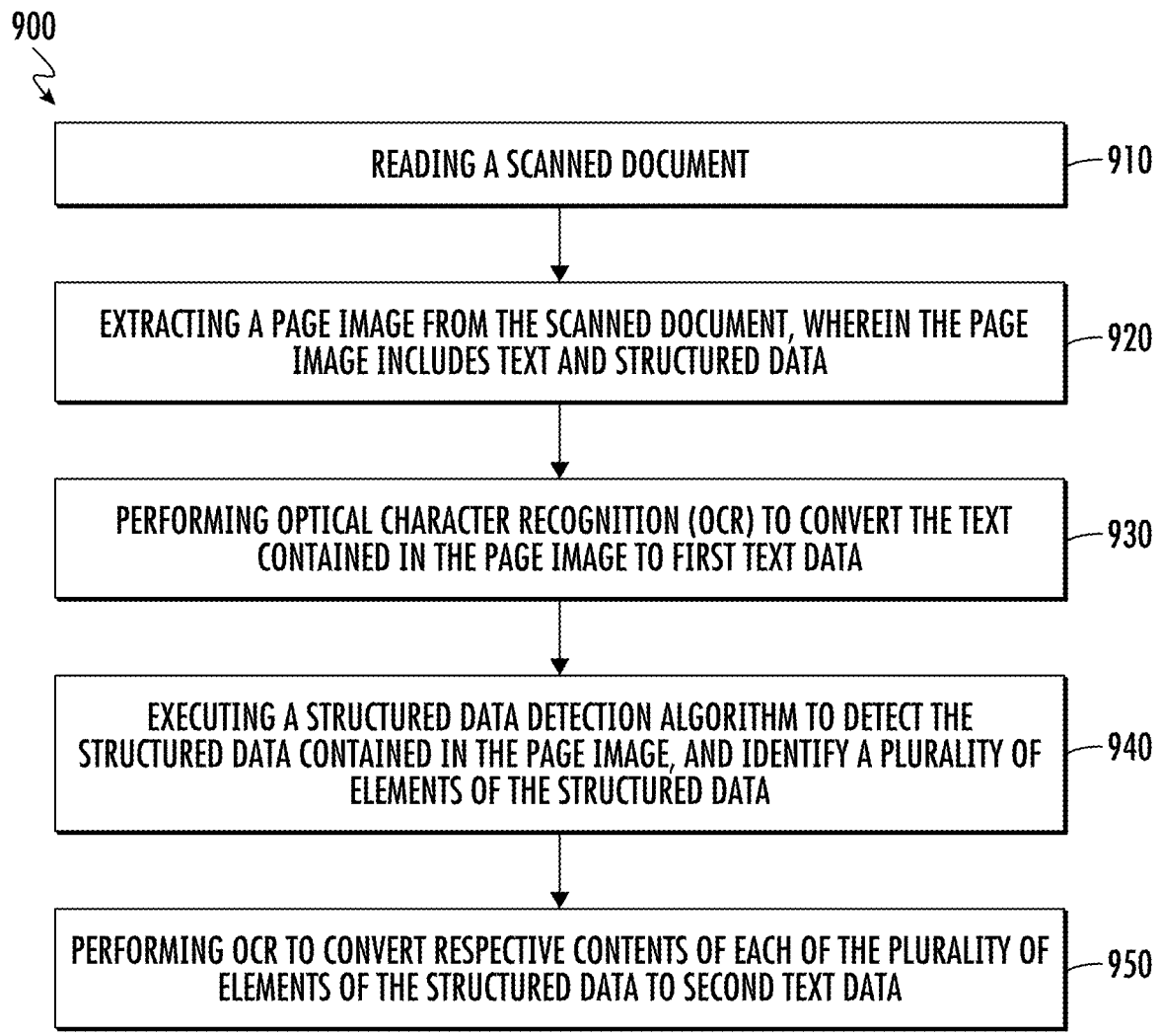
FIG. 9 is a flow diagram illustrating operations for detecting structured data in a scanned document according to an example implementation described herein.

Referring now to FIG. 9, yet another example method 900 for retrieving information from scanned documents is shown. This disclosure contemplates that the operations of FIG. 9 can be performed using a computing device such as the computing device shown in FIG. 7. It should be understood that the operations of FIG. 9 can optionally be performed using a plurality of computing devices. As shown in FIG. 9, a scanned document is read 910, and a page image is extracted from the scanned document at step 920. At step 930, optical character recognition (OCR) is performed to convert the text contained in the page image to first text data. At step 940, a structured data detection algorithm is performed to detect the structured data contained in the page image and identify a plurality of elements of the structured data. The structured data detection algorithm can optionally include one or more of the operations described with regard to FIGS. 11-13 (e.g., cell boundary detection, table boundary detection, and table detection). Thereafter, at step 950, OCR is performed to convert respective contents of each of the plurality of elements of the structured data to second text data. For example, when the structured data is a table, OCR is performed to convert respective contents of each cell (e.g., respective contents located at intersection of row and column) of the table to second text data.

Figure 10:
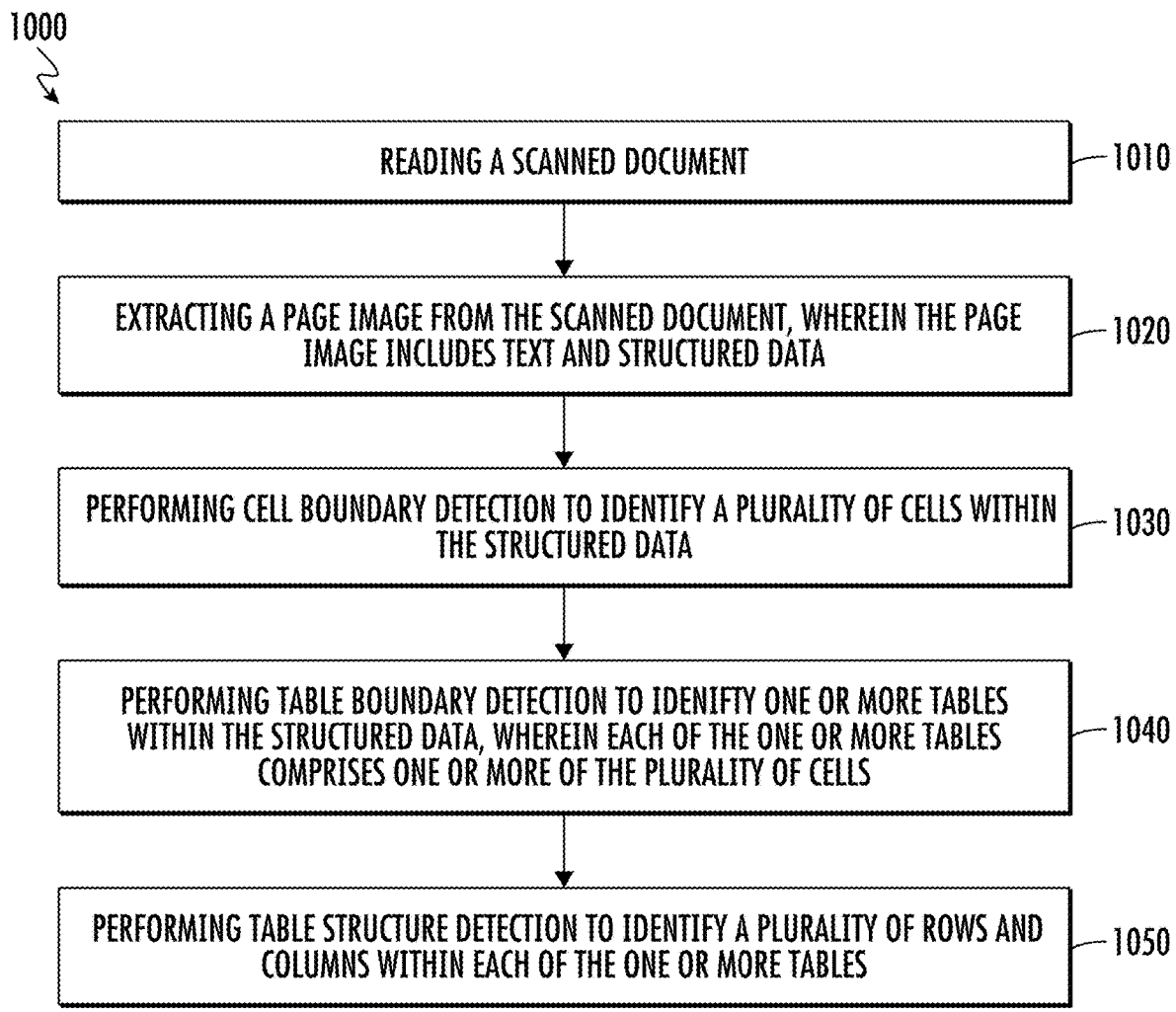
FIG. 10 is a flow diagram illustrating operations for detecting structured data in a scanned document according to another example implementation described herein.

Referring now to FIG. 10, another example method 1000 for retrieving information from scanned documents is shown. This disclosure contemplates that the operations of FIG. 10 can be performed using a computing device such as the computing device shown in FIG. 7. It should be understood that the operations of FIG. 10 can optionally be performed using a plurality of computing devices. As shown in FIG. 10, a scanned document is read 1010, and a page image is extracted from the scanned document at step 1020. At step 1030, a cell boundary detection algorithm is performed to identify a plurality of cells within the structured data. Cell boundary detection can optionally include one or more of the operations described with regard to FIG. 11. At step 1040, a table boundary detection algorithm is performed to identify one or more tables within the structured data. One or more tables may comprise one or more of the plurality of cells. Table boundary detection can optionally include one or more of the operations described with regard to FIG. 12. Finally, at step 1050, a table structure detection algorithm is performed to identify a plurality of rows and columns within each of the one or more tables. Table detection can optionally include one or more of the operations described with regard to FIG. 13.

Figure 11:
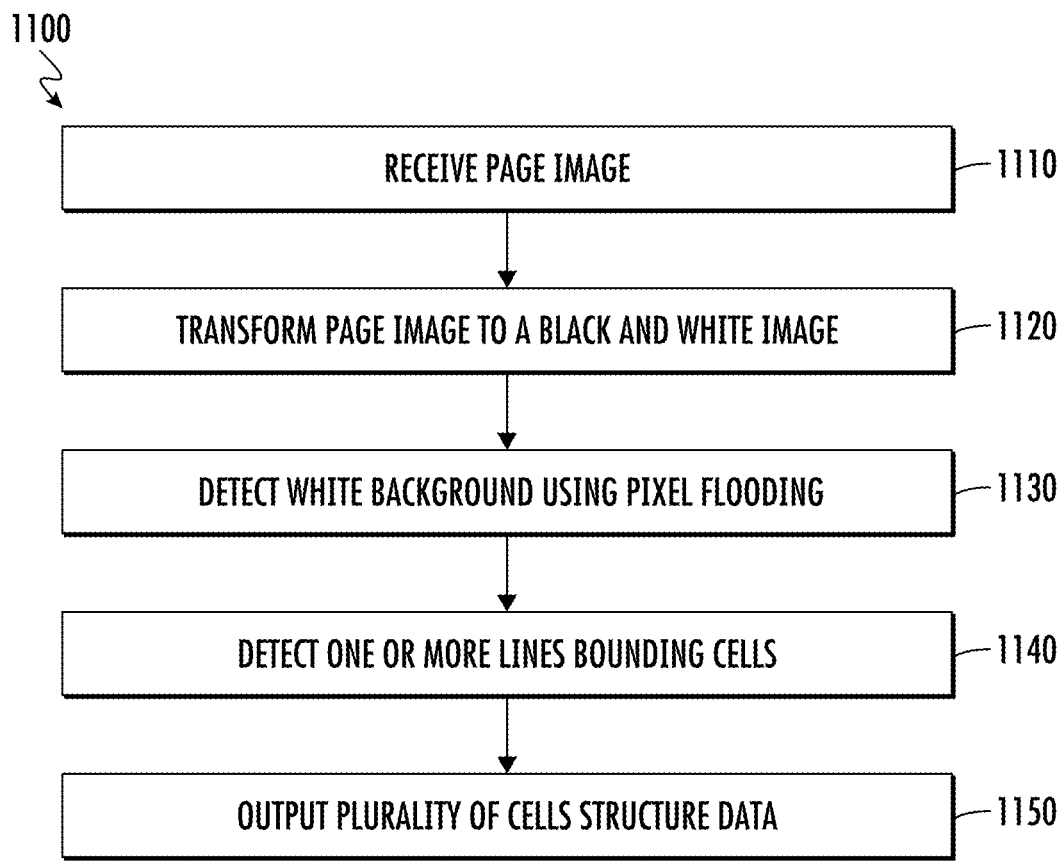
FIG. 11 is a flow diagram illustrating a cell boundary detection algorithm according to an example implementation described herein.

Referring now to FIG. 11, an example method 1100 for cell boundary detection is shown. This disclosure contemplates that the operations of FIG. 11 can be performed using a computing device such as the computing device shown in FIG. 7. It should be understood that the operations of FIG. 11 can optionally be performed using a plurality of computing devices. As shown in FIG. 11, a page image is received (1110). At step 1120, the page image is transformed to a black and white image. At step 1130, a white background is detected using pixel flooding, described previously. At step 1140, one or more lines bounding cells are detected. Thereafter, at step 1150, a plurality of cells structure data is output.

Figure 12:
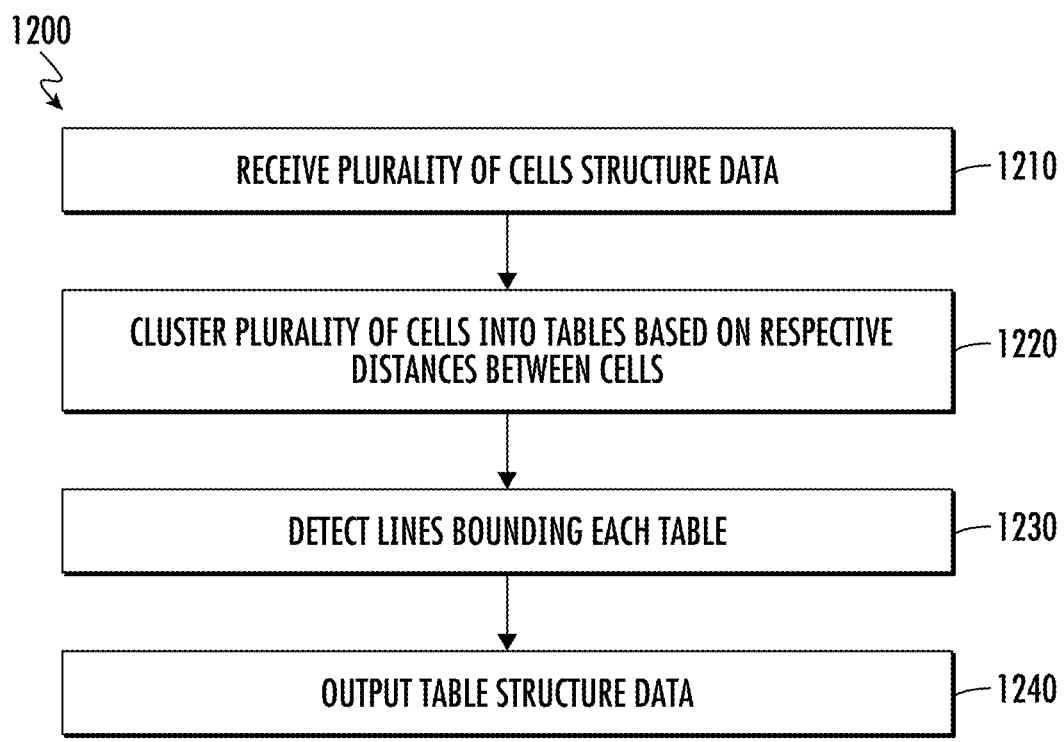
FIG. 12 is a flow diagram illustrating a table boundary detection algorithm according to an example implementation described herein.

Referring now to FIG. 12, an example method 1200 for cell boundary detection is shown. This disclosure contemplates that the operations of FIG. 12 can be performed using a computing device such as the computing device shown in FIG. 7. It should be understood that the operations of FIG. 12 can optionally be performed using a plurality of computing devices. As shown in FIG. 12, a plurality of cells structure data is received (1210). At step 1220, the plurality of cells structure data is clustered into tables based on respective distance between cells. At step 1230, lines bounding each table are detected. At step 1240 table structure data is output.

Figure 13:
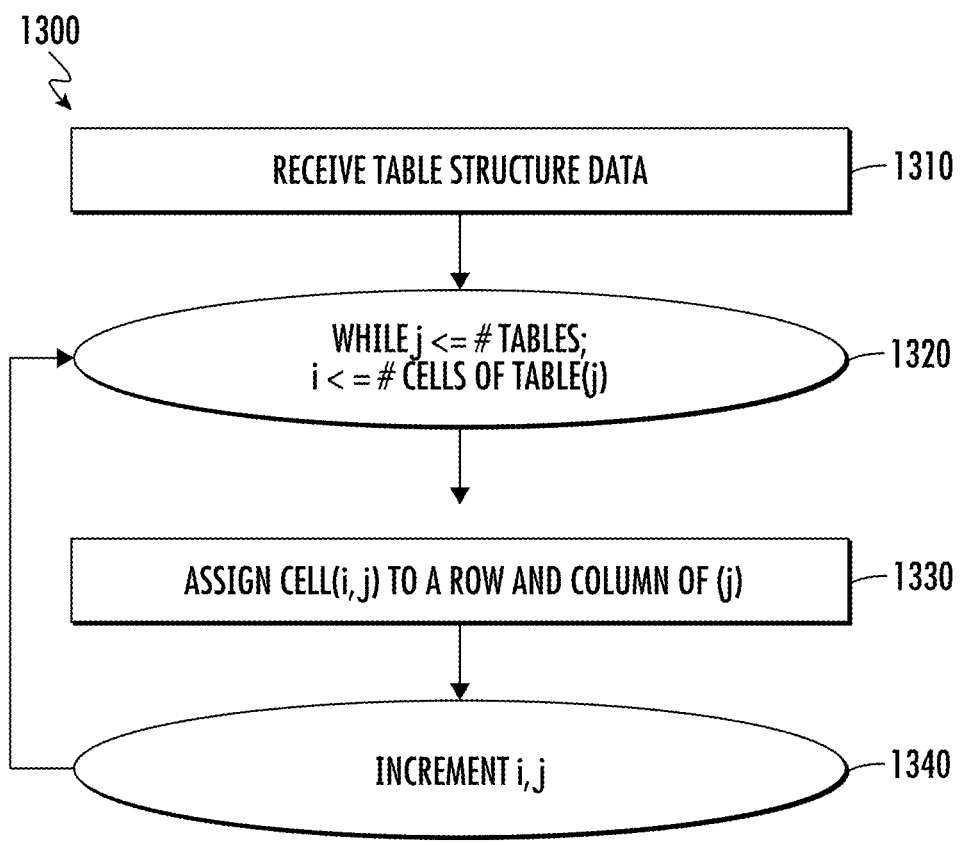
FIG. 13 is a flow diagram illustrating a table structure detection algorithm according to an example implementation described herein.

Referring now to FIG. 13, an example method 1300 for cell boundary detection is shown. This disclosure contemplates that the operations of FIG. 13 can be performed using a computing device such as the computing device shown in FIG. 7. It should be understood that the operations of FIG. 13 can optionally be performed using a plurality of computing devices. As shown in FIG. 13, table structure data is received (1310). At step 1330, each of the plurality of cells (i) in each of the one or more tables (j) is assigned to a row and column of a table (j). At steps 1320 and 1340, all cells of a table, j, and all tables are iterated over to assign all of the plurality of all of the one or more tables to rows and columns.

An example computer-implemented method for detecting structured data in a scanned document is also described herein. The method includes reading a scanned document; and extracting a page image from the scanned document, where the page image includes text and structured data. The method also includes performing cell boundary detection to identify a plurality of cells within the structured data; performing table boundary detection to identify one or more tables within the structured data, where each of the one or more tables includes one or more of the plurality of cells; and performing table structure detection to identify a plurality of rows and columns within each of the one or more tables.

Example Computing Device

It should be appreciated that the logical operations described herein with respect to the various figures may be implemented (1) as a sequence of computer implemented acts or program modules (i.e., software) running on a computing device (e.g., the computing device described in FIG. 7), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 7, an example computing device 700 upon which the methods described herein may be implemented is illustrated. It should be understood that the example computing device 700 is only one example of a suitable computing environment upon which the methods described herein may be implemented. Optionally, the computing device 700 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 700 typically includes at least one processing unit 706 and system memory 704. Depending on the exact configuration and type of computing device, system memory 704 may be volatile (such as random-access memory (RAM)), non-volatile (such as read-only memory (ROM), flash memory, etc.), or some combination of the two. This most basic configuration is illustrated in FIG. 7 by dashed line 702. The processing unit 706 may be a standard programmable processor that performs arithmetic and logic operations necessary for operation of the computing device 700. The computing device 700 may also include a bus or other communication mechanism for communicating information among various components of the computing device 700.

Computing device 700 may have additional features/functionality. For example, computing device 700 may include additional storage such as removable storage 708 and non-removable storage 710 including, but not limited to, magnetic or optical disks or tapes. Computing device 700 may also contain network connection(s) 716 that allow the device to communicate with other devices. Computing device 700 may also have input device(s) 714 such as a keyboard, mouse, touch screen, etc. Output device(s) 712 such as a display, speakers, printer, etc. may also be included. The additional devices may be connected to the bus in order to facilitate communication of data among the components of the computing device 700. All these devices are well known in the art and need not be discussed at length here.

The processing unit 706 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 706 for execution. Example tangible, computer-readable media may include, but is not limited to, volatile media, non-volatile media, removable media and non-removable media implemented in any method or technology for storage of information such as computer readable instructions, data structures, program modules or other data. System memory 704, removable storage 708, and non-removable storage 710 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 706 may execute program code stored in the system memory 704. For example, the bus may carry data to the system memory 704, from which the processing unit 706 receives and executes instructions. The data received by the system memory 704 may optionally be stored on the removable storage 708 or the non-removable storage 710 before or after execution by the processing unit 706.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

EXAMPLES

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

In an example use of the disclosed method, an electronic health records' "255 Mile" paper problem was considered.

On average, more than 5,000 patients are transferred from one emergency department (ED) to another hospital for emergency care. When occurring between systems that do not share EHRs, paper records are sent. For patients who have overwhelming sepsis in which rapid treatment with antibiotics is essential for survival and optimal outcomes, the timing, appropriateness, and dosing interval of antibiotic administration can mean the difference between life and death. During emergency transfers, there may be between 40 and 200 pages of documentation that individual clinicians must manually wade through to identify all of these data which may be time consuming and lack completeness. Further, this information lack integration with current management to identify potential life-threatening allergies or drug-drug interactions. An automated solution that can identify such critical medical information, while attributing it to the right patient, regardless of order of documentation, is essential to ensure the rapid coordination of care for such a seriously ill patient. There are numerous applications to other areas of clinical documentation including labs, radiologic imaging, clinician notes, and vital signs.

The Medical Information Retrieval Representing Optically Recognized (MIRROR) EHR engine, as disclosed and exemplified in FIGS. 1 and 2, is a data adaptive system. MIRROR was able to address the major problem described above. As illustrated in FIG. 1, MIRROR took a series of imaged documents in PDF format and performed a series of operations with the goal of transforming the images into computable text for processing within a series of NLP pipelines.

Within healthcare, there are numerous potential applications of such technology. There are opportunities for identification of medications, laboratory, clinical exam, and clinician documentation across ambulatory and inpatient settings. Although healthcare is provided as an example application for MIRROR EHR, an engine such as MIRROR EHR is not limited to medical applications. For example, beyond healthcare, the legal industry relies heavily on scanned documentation to share files for discovery and depositions, many of which require individuals reading the documents to access the information contained therein. Alternatively, text-based documents may be produced, but NLP and applications to process these hundreds and thousands of pages are not used. Finally, content management in social media (e.g., Meta, TikTok, Twitter) is challenged by not being able to identify an image that may contain text subject to their content filtering algorithms. Doing so would enable content managers to identify those who try to evade their algorithms with images containing text. Accordingly, this disclosure contemplates applying an engine such as MIRROR EHR to other applications. This may include applying methods to retrieve information from scanned documents (e.g. as described above with regard to FIGS. 8-13) for healthcare and non-healthcare applications.

Example 2

In an example use of the disclosed method, the scanned document problem of identifying tabular data in scanned medical records was considered.

Inter-hospital transfers (IHT) are common. The practice of handoff between institutions is inconsistent and despite best efforts, electronic medical records for transferred patients are often not available or not used, requiring paper transfer documentation.

Paper medical records are printed from the transferring institution's electronic medical record (EMR) and are transferred with the patient. They typically contain some information about the patient's history, presenting complaint, vitals on arrival, objective data such as labs and imaging, and an account of interventions including medications administered to the patient. Scanning papers into the chart leaves us with images of text, however automatic extraction of information from these documents requires optical character recognition.

Optical character recognition (OCR) is largely solved; however transfer documents frequently contain tabular reports of information such as administered medications or lab values. These tables are often bounded by lines that are not interpretable by OCR and may confuse the system, which is looking for text characters. For this reason, document structure analysis must be used initially to define segments of text on which to apply OCR.

The current document structure analysis landscape, specifically with respect to table identification and analysis, is dominated by stochastic algorithms. Although there is some work in identification of structured data in biomedical literature, there is little apparent work being done in medical record document structure analysis. Given the number of transfers and importance of information transfer, it is contemplated that that medical record document structure analysis is important. In this example, a simple, fast, deterministic algorithm to identify bounded table structures and to analyze their underlying structure is described. As described herein, the method includes a cell boundary detection algorithm (see e.g., FIG. 11) and a table boundary detection algorithm (see e.g., FIG. 12).

Methods and Results

The described method, including cell boundary and table boundary detection, was built in the java programming language in the eclipse development environment, hereafter the algorithm. It was built iteratively using a small training dataset including several images of inter-hospital transfer reports that contained bounded tabular data.

The input of the algorithm, which is described below, is a scanned image that represents one page of an inter-hospital transfer report document. The output of the algorithm includes (a) whether or not the image contains bounded tabular data, (b) a list of dimensions of tables included in an individual image and (c) a list of dimensions of cells that are included in each table.

The algorithm was tested on a set of 54 images from inter-hospital transfer reports from patients arriving at an institution. Images of documents with handwriting were not included. Algorithm results were compared to a gold standard created by manual review. Identification of a table cell is considered a true positive if the rectangle identified contains the entirety of the text inside of a table cell. The results were reported using precision and recall.

The study used the cell boundary and table boundary detection algorithms, as described in previous sections (see e.g., 11-13), to process the inter-hospital transfer reports.

The algorithm was applied to 54 pages containing 34 tables with 1088 individual cells. Cell detection was 98.3% precise and had 85.5% recall.

The algorithm, as built based on the described method, identifies and analyzes the structure of tables within images with 98.3% precision and an f-measure of 0.914, comparable to modern stochastic methods. This algorithm will serve as a component of the document image analysis engine, helping to more successfully analyze text with OCR and place it within the appropriate syntactic structures.

Discussion: There were a number of reasons why the algorithm may not appropriately pick up table cells. Holes punched in a document may result in breaks in the boundaries that define cells. Very small cells may not be identified. Poor fidelity of the scan may result in artifacts that either over or underrepresent barriers between cells. Additionally, handwriting or stickers placed on pages may result in false positive cell boundaries. Transmission of complete, high-fidelity documents without alteration with handwriting or punched holes improves the ability to rebuild the tabular data found within.

When individual cells were not identified, however, the clustering method for table boundary detection almost universally included those cells within the bounds of the detected table. Areas that are included in a final table but not in its component cells may serve as evidence for the imputation of cells that were missed due to missing or interrupted boundaries.

Although transmission of high-fidelity unaltered documents is preferable, this is not always how they arrive to an institution. In is contemplated that the present algorithm can be applied to various types of documents and can be adapted to impute table structure from imperfect table barriers.

Example 3

In an example use of the disclosed method, the study "AUTO-PILOT: Development and Validation of a Tool to Extract Structured Data in Interfacility Transfer Paperwork" (Wrenn J O, Lin S G, Han J H, Reeves R M, Westerman D M, Matheny M E, Ward M J. AMIA; 2022 Nov. 5; Washington, DC and Wrenn J O, Westerman D, Reeves R M, Ward M J. 221EMF Development and Validation of a Text. Rendering and Data Retrieval System for Extracting Clinical Information from Paper Medical Records. Annals of Emergency Medicine. 2020 Oct. 1; 76(4):S86.) was considered.

Despite broad adoption of electronic health records (EHR), paper records are often used during patient transfer between medical facilities. These records are time consuming to review, and contribute to the inefficient transfer of information, which may in turn decrease the quality of care. (Kripalani S, LeFevre F, Phillips C O, Williams M V, Basaviah P, Baker D W. Deficits in communication and information transfer between hospital-based and primary care physicians: implications for patient safety and continuity of care. Jama. 2007 Feb. 28; 297(8):831-41). Furthermore, they do not integrate well with receiving EHRs, as they are scanned in and saved as unstructured images of text. Using the described method with MIRROR HER, Automated Universal Transcription Output (AUTO)-PILOT was conducted which was designed to develop, train, and validate MIRROR EHR to identify antibiotics and induction agents from scanned transfer documents of intubated patients transferred from an outside hospital. This study was an ancillary study of the ongoing CO-PILOT parent study (Semler M W, Casey J D, Lloyd B D, Hastings P G, Hays M, Roth M, Stollings J, Brems J, Buell K G, Wang L, Lindsell C J. Protocol and statistical analysis plan for the Pragmatic Investigation of optimal Oxygen Targets (PILOT) clinical trial. BMJ open. 2021 Oct. 1; 11(10):e052013) which is a cluster-randomized trial examining the effect oxygen saturation targets on 12-month cognition in mechanically ventilated patients.

The MIRROR EHR pipeline (see e.g., FIGS. 1 and 2) is comprised of several components that work sequentially. First, records are vertically de-skewed, and tables are identified. Contents of identified tables are extracted and independently sent to the Tesseract OCR engine. (Smith R. An overview of the Tesseract OCR engine. In Ninth international conference on document analysis and recognition (ICDAR 2007) 2007 Sep. 23 (Vol. 2, pp. 629-633). IEEE). The OCR module then extracts all text from preprocessed documents as tokens. These tokens can then be reassembled into text that serves as a foundation for further text analysis by MIRROR's NLP module.

Methods

Transfer records were selected for intubated patients transferred to Vanderbilt University Medical Center's medical intensive care unit (ICU) from July, 2019 to July, 2020 who met CO-PILOT eligibility criteria and had documented record of intubation. All documents were annotated for antibiotic or induction agent, and associated administration time, dosage, and route. Scanned documents were then processed using the MIRROR EHR pipeline. Data produced by preprocessing and OCR were compared to annotated records. Matches were considered exact if the OCR-produced token instance nearest to the annotated record's instance matched exactly. Partial matches were calculated using the Levenshtein Edit Distance (LED) ratio, and a successful partial match was defined as LED ratio 50% between the annotated record instance and nearest OCR-produced instance. The reported results include the OCR output including number of exact and partial matches to the annotated records and percent of all annotated records. Also reported were median and interquartile range (IQR) of the LED ratio for partial matches.

Results 35 transfer records were annotated, with 1329 individually annotated records. Table 1 (FIG. 14) demonstrates the performance of AUTO-PILOT preprocessing and OCR at retrieval of antibiotics, induction agents and associated metadata, detailing the number of exact and partial matches as well as the number of elements that went unmatched. Overall, the tool exactly identified 59% and partially matched 92% of annotated records. Table 2 (FIG. 15) demonstrates the median and IQR of Levenshtein Edit Distance (LED) Ratios for partial matches between annotated records and those produced with MIRROR EHR preprocessing and OCR.

Conclusions

MIRROR EHR, a tool for extracting structured data from unstructured images of transfer documentation was implemented in this study. MIRROR EHR's preprocessing and OCR partially or exactly matched 92% of information about antibiotics and medications used to induce general anesthesia, as well as information about the timing, dosage, and route of administration. This represents an important step in managing imaged scanned medical records, facilitating the extraction of structured data within the image and preparing it for other tools (e.g., NLP). Using this example of records from transferred, critically ill patients, this study represents an important first step in integrating medical data that is historically stored as images within the EHR and transforming it into structured computable data.

Example 4

In an example use of the disclosed method, a preliminary study of 489 pages from twenty-eight medical charts of stroke patients transferred from seven unique EDs was conducted; using open-source OCR to identify five metadata elements (patient name, birthdate, provider name, note date, and facility metadata), the process accurately identified 97% characters (1717/1771) and demonstrates the feasibility of deploying OCR in preparation for classification of unstructured data using NLP.

It is contemplated that potential applications of this process in clinical care, operations, and research are far-reaching and address the need for rapid, accurate information exchange for patients with acute ischemic stroke, which is highly time sensitive. In the ED, information exchange is challenging because of non-standardized communication, including the format and volume of shared medical records. Therefore, in this study, the described method was refined, validated, and piloted to summarize voluminous transfer records that otherwise would remain in imaged documents. In a high-volume stroke center, it is contemplated that the application of the described method could enhance the ability to obtain the correct information quickly for patients with acute stroke in the following example applications.

In a contemplated embodiment, the method can additionally or alternatively include iteratively combine content expertise and end-user input to refine the combined OCR/NLP system to process scanned records for transfer patients with acute ischemic stroke.

Background

Between 2009 and 2014, transfers from U.S. emergency departments (EDs) increased 9.3%, to 2.1 million annually. Across 15 disease categories, such transfers were associated with higher costs, longer hospitalization, and greater risk of post-discharge need for skilled nursing or rehabilitation. Transfers also disproportionally affect rural ED patients who are nearly 40-times more likely to be transferred than their urban counterparts, and uninsured patients with time-sensitive emergencies like acute myocardial infarction.

Recent advances in the field of biomedical informatics offer opportunities to overcome this problem by optimizing accuracy of scanned medical records. Image processing to enhance image quality combined with optical character recognition (OCR) software can convert images of varying quality containing typed or handwritten text into machine-encoded text. Combined with natural language processing (NLP), which trains algorithms to transform large amounts of textual data to standardized points of information, text contained in images can be converted into computable, structured data for near-real time information sharing.

Acutely ill patients are particularly susceptible to breakdowns in communication during the inter-facility transfer care-transition. The National Transitions of Care Coalition recognizes that information transfer is at the center of effective care transitions. Information transfer is characterized by presence, accuracy, completeness, and integration within the information system. Yet, deficits in communication and information transfer between providers during care transitions are common, affect the quality of care, diminish physician satisfaction, and harm patient outcomes. Despite health information exchanges ([HIE] e.g., Epic System's Care Everywhere), major limitations remain. Providers report that inter-hospital information exchange in suboptimal and that 90% of patients arrive without necessary medical information. Paper records are frequently sent with the patient or faxed and scanned into the EHR. These scanned images have limited clinical utility: they are not searchable, have no identifying metadata, and require a manual chart review for single-use utilization. This 'Scanned Document Problem' is a major challenge that affects millions of emergency patients annually, diminishes the quality of patient care, and contributes to provider burnout.

Transfers are a major source of health equity disparities for uninsured and rural patients. Insurance status may be a key non-medical factor associated with increased rates of transfer from U.S. EDs. The Emergency Medical Treatment and Labor Act (EMTALA) was passed in 1986 with the intent that timely care be provided to all Americans with an emergency medical condition regardless of the ability to pay. However, while EMTALA investigations and resulting citations are common at the hospital-level, violations and resulting citations were rare at the ED-visit level. Moreover, investigations and subsequent citations decreased from 2005 to 2014. Infrequent EMTALA enforcement within EDs may explain why insurance status is a key non-medical factor in increased ED transfer rates for patients with emergency medical conditions. Uninsured patients presenting to EDs with ST-Elevation Myocardial Infarction (STEMI) are 60% more likely to be transferred than patients with any form of insurance. Uninsured ED patients are more than twice as likely as insured patients to be transferred (adjusted odds ratio 2.1, 95% CI 1.7, 2.6). Lack of EMTALA enforcement may explain why the uninsured population have the highest risk of transfer across all insurance status classifications. Across a wide range of emergent conditions, including nephrologic, psychiatric, oncologic emergencies, spinal trauma, traumatic brain injury, orthopedic trauma, and hand injuries uninsured patients, including pediatric patients, are more likely to be transferred.

Preliminary Data

Scanned Document Pilot: To determine the feasibility of providing large scale OCR conversion of imaged medical records as a preprocessing step to NLP extraction of EHR metadata, twenty-eight imaged medical records stored as PDF files that were sourced from seven clinical sites were reviewed, assessing both speed and recognition characteristics. The documents reflect many known challenges to processing scanned or faxed documents, such as noise, skew, legibility, and artifacts (e.g., handwriting) that obscures readability. PDFs were extracted into images—one per page—and then the OCR system, Tesseract, was employed to extract text from each. The text was concatenated to reproduce one document per PDF.

Performance Characteristics: Twenty-eight scanned medical records produced 498 images, taking approximately 0.85 seconds/page. OCR over each image took <2 seconds/page. To represent the gold standard dataset that would be required to train and evaluate an NLP system to recognize raw text mentions of selected metadata items and classify them in a standardized way, two reviewers compared the original image data to the raw text result of the OCR processing comparing five metadata items. Evaluating by the proportion of correctly matching characters, the recognition and match rates were as follows: patient name—87%; birthdate—98%; provider name—97%; note date—99%; facility metadata—96%; summary of all items—97%.

Rural ED patients are much more likely to be transferred than urban patients. Rural patients have an inter-facility transfer rate that is 40 times higher than urban patients. Previous work in the VA found that among Veterans transferred from EDs, the incidence of inter-facility transfer is three time higher for rural compared with urban Veterans. The preliminary data demonstrates both the feasibility and the accurate performance of the OCR software and significance of this method for rural patients who are disproportionately affected by transfers.

This study advances the informatics approach to handling static images and changing the paradigm of information consumption in healthcare. The OCR-to-NLP platform requires 2-stage information delivery: patient and healthcare setting metadata for basic system-to-system recognition purposes, and information classification for staging data integration. This information delivery is highly innovative in three ways: a) transformation of information streams of distinctly different types, b) constructing system-level metadata to facilitate health data exchange, and c) deploying information extraction to classify documents. Developing a tool to recognize and classify unstructured clinical and operational data from scanned charts to create structured, indexed, and searchable data will be a major shift in the process for information transfer.

A set of algorithms were developed and validated to recognize text through OCR, process the images, then train the NLP system to identify and produce select categories of structured metadata from the unstructured text output of the OCR, as shown and described per FIGS. 1-13. The algorithm was tested in a use-case for acute ischemic stroke patients transferred to a single comprehensive stroke center to measure the performance across eleven metadata elements in acute stroke care.

In a first example application of this study, text extraction and NLP methods were developed to identify eleven key demographic, clinical, and operational data in a 2017 stroke transfer cohort. The preliminary data demonstrates that use of open-source OCR software is feasibly applied to stroke transfer patients from distinct facilities. It is contemplated that the method can be refined to improve performance of this system by including image processing to remove artifact, skew and other characteristics that may inhibit optimal OCR. Next, OCR was used to convert each document to raw text. Subsequently, an NLP algorithm was trained to extract and classify eleven metadata variables Demographic:

Patient name, date of birth, sex, race; Clinical & Operational: transferring facility, ED nurse and MD names, last known well timestamp, labs (values and timestamps), imaging performed (including results and timestamps), tPA administered timestamp, ED timestamps (arrival, triage, examined, EMS arrived, exit)) from the raw text documents to provide transfer-relevant labelling. Text searches over resulting labeled raw text documents and recognized concepts per document were indexed as an experimental value-added step.

NLP Development: The OCR/NLP pipeline was developed and refined using inter-facility transfers occurring in 2017. was developed and tested. For this study, an OCR/NLP system was incorporated within the UIMA (Unstructured Information Management Architecture) framework of the CLAMP NLP system to augment the OCR/NLP system with Unified Medical Language System (UMLS)-mapping capabilities. The UMLS is a set of standardized medical vocabularies commonly used by NLP systems for clinically relevant text mining services. This final step provided the final NLP output with the indexed UMLS terms for rapid search functionality over the text contained in the original scanned documents.

To train and test the system to extract the values for the EHR metadata targeted for this project, a reference standard was constructed, one portion of which will be consumed as training data and one portion of which will function as a hold-out set for evaluation. Using the extracted text documents output by the OCR module, the text documents with eleven classes of metadata label key value pairs was annotated. For example, for the class PATIENT NAME, key="name:" value="Doe, John"; class DATE OF BIRTH, key="birthdate:" value="Jan. 1, 1999". To establish a reference standard for classes, all records used for training, validation, and testing, and a third adjudicator will resolve disagreements were annotated. NLP performance is a function of both concept frequency and the degree of variation in phrases used to express that concept. Most of the variables occurred at least once in every document, and comparatively few variations in the text forming the anchoring key portion of most classes (e.g., "DOB", "Date of Birth", "born"). Thus, the needed size of the annotated corpus of documents was modest, requiring a maximum of 150 records.

Annotation classes were based on an annotation schema and guidelines developed by annotators. Retraining and guideline refinement was continued until intra-annotator agreement was >80%. Annotated documents were divided into a training and validation set (two-thirds of annotated corpus) and test set (⅓ of corpus), using PPV and TPR to assess the ability of NLP to identify the schema classes. System development and training was continued until cross-validation demonstrates an F-measure (harmonic mean of PPV and TPR) of >85%. When differences were found between reference standard and the NLP techniques in the development dataset, manual review of the related documents was undertaken to determine the causes of the differences (detailed failure analysis). The causes were summarized and categorized, and the frequency of each type described within both aggregate and individual document types so that algorithmic limitations were identified and addressed. The final NLP system was tested on the hold-out test dataset. Subsequently the entire corpus was run through the CLAMP NLP system for concept indexing.

In a second example application of this study, two trained abstractors performed structured chart review to validate the final OCR/NLP system in a new cohort of 200 stroke transfers during 2018. The OCR/NLP pipeline of the first example application of this study was validated using 200 randomly selected stroke transfer charts from 2018.

Data Collection: Accuracy of each software platform was assessed via manual review performed by a trained data abstractor for 200 electronic records in which the patient was transferred to VUMC for acute ischemic stroke and for which pre-hospital records have been uploaded into the EHR as a PDF. When there were cases in which the trained abstractor was unable to assess one or more components of the software, a second trained reviewer conducted an assessment, and the final determination was based on consensus. In preparation, 200 charts among inter-facility stroke transfers to Vanderbilt in 2018 were randomly selected. With approximately 170 inter-facility stroke transfers monthly, this was highly feasible. Transfers for which the electronic records were scanned and uploaded into the EHR were included in the study. When there were situations in which more than one record was uploaded, the higher page count record was selected. Patients missing electronic records were excluded and a substitute record was obtained. Each record was downloaded and stored securely, and subsequently run through the OCR/NLP pipeline. Two trained human abstractors reviewed existing charts and compared against each of the eleven metadata classes, with disagreements resolved by a third reviewer. Scoring of the OCR/NLP pipeline's performance proceeded in two steps: Step 1 assessed the accuracy of the character recognition. Each variable was scored by the percentage of characters matched. A perfect match scoring 100%, the number of characters misidentified in a partial match proportionally reducing the score, and a variable that the system fails to identify at all scoring a zero. Step 2 assessed the accuracy of the NLP classifications defined by the metadata label key and value pairs (e.g., Class PATIENT NAME key="name:" value="Doe, John"). For each of the eleven metadata classes, the human review compared key value pair to the NLP-derived key value pair.

Statistical Analysis: The validity of selected feature domains was assessed, and these were used to compute overall sensitivity (or recall), positive predictive value (PPV or precision), and F-measure (harmonic mean of sensitivity and PPV) for each software platform to completely and correctly classify each of the selected variables. Percentages for PPV and their 95% confidence intervals were computed for binomial proportions using Wilson's formula, which approximates the exact method.

Validation: In preparation for the third example application of the study, the finalized output (11 NLP metadata classes accompanying each record, text versions of scanned records with recognized concepts indexed) was asynchronously shared with the acute stroke care team including the stroke coordinator, the stroke nurse manager, and a sample of three emergency physicians. Input from this advisory group was used to finalize a one-page summary.

In a third example application of this study, the method, including an OCR/NLP pipeline, was used in the Emergency Department for use by acute stroke care providers at the point of care for stroke transfers. The feasibility and usability of implementing this OCR/NLP system was evaluated to summarize transferring ED care using input from an advisory team of acute stroke care providers with a convenience sample of 50 patients.

Study Subjects. From January 2020 to April 2020 a convenience sample of 50 transfer cases was studied. Printed summaries of the transferring ED records were provided to EM physicians (attending and resident) and stroke clinicians (neurologists and coordinators) and then provided them with brief, written surveys.

Outcomes. The feasibility and usability evaluation by emergency physicians and stroke team clinicians was the primary outcome. Feasibility included the efficiency of the production of the summary and availability of records to use this OCR/NLP system. Efficiency was defined as the time (in seconds) from receipt of the paper (or if already scanned) records until production of the printed written summary. Usability was assessed using the System Usability Scale (SUS). The SUS is a simple, 10-item, 5-point Likert scale allowing users to provide a subjective assessment of the usability of a tool. SUS is a validated tool widely used in informatics to assess usability of technology.

Analysis. Given the limited sample size of this study, the analysis was primarily descriptive. The median efficiency of summary production was calculated, and the data was visually represented using boxplots. The rate of available records was calculated for use of the OCR/NLP pipeline as a simple proportion. For usability, a SUS score was calculated by summing the scores across items which range from 0 to 4. The score contribution for favorable odd numbered items (1,3,5,7 and 9) was the scale position minus 1. For the unfavorable even numbered items (2,4,6,8 and 10), the contribution was 5 minus the scale position. The sum of the scores was multiplied by 2.5 to obtain the overall score. Similar to efficiency, usability was assessed with simple descriptive statistics. Qualitative evaluation of comments available through the SUS was also carried out.

Example 5

In an example use of the disclosed method, a system can be developed by applying the disclosed method to interpret DXA reports by first training on reports from the West Haven CT VA medical Center, and then validating the system on DXA reports from a combined dataset from both West Haven and Newington to gauge the generalizability of the developed system. West Haven VAMC averages about 700 DXA reports per year. These are performed within the VAMC, with imaged reports available for manual review in VistA Imaging. Nearby at the Newington VA, veterans in need of bone density tests are currently obliged to have them conducted in non-VA facilities, thus potentially generating more variation in report characteristics. The dataset from West Haven can be used to recalibrate one part of the system, train and evaluate a dependent downstream module, and validate the finalized version against the DXA reports from a combined dataset of reports from both West Haven and Newington.

Introduction: Image processing to enhance image quality combined with optical character recognition (OCR) software converts images of varying quality, containing typed or handwritten text, into machine-encoded text. Combined with NLP for transforming large amounts of textual data to standardized points of information, text contained in images can be converted into computable, structured data for near-real time information sharing. At present MIRROR EHR has been trained to extract from imaged records a set of patient-specific variables for patient identification, to identify evidence of CT scan, to capture and classify medication mentions as belonging to specific medication concepts (e.g., ANTIBIOTIC, INDUCTION DRUG), and assign these concepts to related dosage and time of administration text mention. An open-source implementation of Tesseract (https://github.com/tesseract-ocr/tesseract) as adapted for use within MIRROR's OCR module for converting character images to text to which NLP techniques are applied for extracting and classifying clinically relevant data. Configuration of the OCR module for the current version was achieved by iterating through various Tesseract configurations informed by a training corpus which established the OCR module that MIRROR EHR uses.

This study can further exemplify the use of MIRROR's capabilities with new training data for recognizing bone density scores from DXA imaged reports, a task that is entirely feasible in that the current modules are already customized for interpreting text embedded in tables and requires minimal training to recognize a new datatype. The OCR module was deployed with a retrained NLP module for extracting bone density scores from DXA reports.

A set of algorithms were developed and validated to recognize text through OCR, process the images then train the NLP system to identify a select set of categories and values from the unstructured text output of the OCR. The final algorithm can be tested for generalizability within the use-case of processing DXA reports. It is contemplated that adapting MIRROR EHR to the use case of DXA reports will largely be a matter of configuring and re-training the NLP modules on recognizing text mentions of bone-density test scores within tables. The instances within the more traditional NLP domain of sentential contexts, which the system deploys a distinct battery of algorithms for, offer more tractable text anchors for data capture and classification.

The OCR-to-NLP system requires 2-stage information delivery: patient and healthcare setting metadata for basic system-to-system recognition purposes, and information classification for staging data integration. This information delivery is achieved in three ways: a) transformation of information streams of distinctly different types, b) constructing system-level metadata to facilitate health data exchange, and c) deploying information extraction to classify documents.

Patient Identifier and Evidence of CT Scan Recognition

The MIRROR EHR system (see e.g. FIGS. 1-2) was used to process scanned records for patients transferred from five area emergency departments to the Vanderbilt Emergency Department in 2019. To test the feasibility of large-scale use of this system, sampling one patient per facility and entry type, the system output was compared to independent human review. Additionally, processing speed was compared against human review time per patient record.

To assess the system's accuracy in recognizing certain EHR features, its output was rated in comparison to the independent human review, for the following classifications: Name; Date of Birth, Gender, Race, Medical Record Number, and presence of CT scan. Those comparisons are shown in Table 3 (FIG. 16). The performance was measured by Precision (Positive Predictive Value) and Accuracy. The measures were calculated as follows, with results shown in Table 4 (FIG. 17).

At the end of the Patient Identifier Study, separate modules for tabular data were developed, and an image-specific annotation tool was used that was modified to log bounding boxes, which provides a translation between the image perspective of document geography to the text-based perspective of character offsets within the OCR-rendered text. To track development modifications and derive unit test evaluations, a workbench was constructed over the OCR output documents, adding string distance metrics (e.g., Soundex (National-Archives-and-Records-Administration. The Soundex Indexing System. https://www.archives.gov/research/census/soundex), Levenshtein Distance (Levenshtein V I. Binary Codes Capable of Correcting Deletions, Insertions and Reversals. In: Doklady, editor. Soviet Physics 1966. p. 707), Damerau-Levenshtein Distance (Bard G V, editor Spelling-error tolerant, order-independent passphrases via the damerau-levenshtein string-edit distance metric. Proceedings of the fifth Australasian symposium on ACSW frontiers 2007: AUS: Australian Computer Society, Inc), Hamming Distance(Hamming R W. Error detecting and error correcting codes. The Bell System Technical Journal. 1950; 2:147-60)) for assigning scores to non-exact matches of text recognized within bounding boxes. The workbench assembly which equipped the OCR module with these logging and tracking methods was a crucial advance in the join between the OCR and the NLP parts of the system. As detailed below, a general purpose NLP system designed for medical records was added, CLAMP (Clinical Language Annotation, Modeling, and Processing) NLP toolkit (Soysal E, Wang J, Jiang M, Wu Y, Pakhomov S, Liu H, et al. CLAMP—a toolkit for efficiently building customized clinical natural language processing pipelines. J Am Med Inform Assoc. 2018; 25(3):331-6) to recognize medication data, administration time, and dose and a temporal reasoning system TARSQI Tool Kit for the interpretation of temporal expressions and their relationship to other recognized concepts. (Verhagen M, Pustejovsky J. Temporal Processing with the TARSQI Toolkit. In: COLING, editor. Coling 2008; Manchester, UK: Coling 2008 Organizing Committee; 2008. p. 189-92).

Within-Document Datatype Division By OCR: Tabular vs Non-Tabular: To identify tables and their component cells, the method, as shown in FIGS. 10-13, was used. In the example first, a modified flood fill algorithm with a seed point near the page margin identifies all areas in the image not bounded by an unbroken line. The algorithm is then iterated over the remainder of the page, flooding all remaining areas that were not initially identified. If over a predetermined threshold size to account for noise and typographic counters, these areas are identified as cells within a table, and their rectangular bounding points are saved. Iteration over the entire image results in a list of cells. Tables are then rebuilt using single-linkage clustering between these identified cells to account for multiple tables within a single page. Each cell is sorted via a density-based clustering algorithm to obtain rows based on density connectivity. (Ester M, Kriegel H-P, Sander J, Xu X, editors. A Density-Based Algorithm for Discovering Clusters in Large Spatial Databases with Noise. KDD; 1996). The x-axis is fixed to a single value (0), allowing density comparison along the y-axis. Thus, clusters of cells along the y-axis most closely represent rows. This approach evolved through experimentation, for clinical notes often have tables with within tables (e.g., forms), resulting in lowered sensitivity in detecting row membership. After row membership was established, each an image of each cell was extracted from the original by the bounding box, passing each through an algorithm to refine the bounding box to reduce collision with surrounding cell borders by reducing size along the x- and y-axis to reduce inclusion of artifacts (e.g., border lines). This clipped image of the cell as shown in FIGS. 4 and 5 is then passed to Tesseract for processing.

The study utilized the disclosed method to recognize instances of 1) induction agent medications, antibiotics and associated 2) administration time and 3) dosage from imaged transfer records of septic patients transferred to the Vanderbilt University Medical Center medical ICU who had documented record of intubation. Two annotators reviewed each record for these three items, with a third as adjudicator, creating the reference standard. The scanned records were processed with MIRROR EHR. Half of the annotated documents were used for training and half were validated against the reference standard. Annotations and data identified by MIRROR were considered a match if all text within the annotation's bounding box was an exact match to MIRROR's output and as a partial match where MIRROR's output in relation to the annotation's bounding box had a ratio of the area of the intersection over the area of the union of no less than 0.75 (as defined by Levenshtein Edit Distance [LED]). The matching results from the OCR module are shown in Table 5 (FIG. 18).

OCR Error Analysis and Staged Developmental Steps: Partially matching strings meeting the LED ratio criteria were stored for a future task of reinterpretation via dictionary, while exact matches were passed on to the NLP module. The relationship between OCR output and the portions of it are imported to the NLP module is entirely deterministic, which, without reinterpretation of mis-rendered characters, partial matching strings will go unrecognized by the NLP module. It is contemplated that a post-processing step including an OCR reinterpretation module with identified contexts in which mis-rendered strings, containing mis-rendered characters can be substituted out, by presenting tokens against a dictionary for strings unmatched in the dictionary, with LED ratio tolerable between 0.50 and 0.75. This approach increases the instances of extracted strings that are then passed to the NLP module. Among non-alphabetic characters, contexts for successful substitution operations were identified. For example, the forward slash character '/' commonly used in date formats is sometimes misinterpreted as the numeral 1, accounting for the poor performance on ADMIN TIME instances. In these contexts, character enlargement techniques can be applied, followed by Gaussian blur to provide precision to possible substitution candidates. (Getreuer P. A Survey of Gaussian Convolution Algorithms. Image Processing On Line. 2013; 3:286-310).

NLP Performance Characteristics: The NLP task of classifying strings that were matched exactly from the OCR output, assigning relations between recognized instances of DRUG NAME and DRUG ADMIN TIME, and between DRUG NAME and the DRUG DOSAGE classes as compared to the reference standard was measured in terms of Precision, Recall and F-measure as detailed in Table 6 (FIG. 19).

Approach for Adapting MIRROR EHR to DXA Reports

Iteratively combine content expertise and end-user input to refine MIRROR EHR to process DXA reports. The OCR methods can be validated against DXA reports in preparation for modifying the NLP methods to identify bone density scores and associated attributes from a selection of DXA reports at the West Haven CT VAMC.

Although MIRROR EHR has been exposed to a large variety of document types among the scanned EHR records, it is contemplated that there will be a sufficient amount of difference optically between DXA reports and those data to warrant recalibration of the OCR module. It is also contemplated that there will be variations in the quality, format and measurement type among the DXA reports, depending on the device used to conduct the imagining and generate the reports. In consideration of the aforementioned samples among DXA reports generated by the DXA machines can be used at the West Haven VAMC to assess MIRROR's existing OCR module to navigate the document geography of this report type, recognize tables, interpret text within cells, and operate over non-tabular data.

Measurement of the processing refinement step consisted of a document level review of the OCR-rendered text by the VUMC development team in comparison to the original document. The comparison task comprises annotating the imaged document for tokens that were incorrectly rendered in the OCR-rendered text document and providing the correct text string. Using the string distance metrics in the workbench (Soundex, Levenshtein Distance, Damerau-Levenshtein Distance and Hamming Distance), the percentage of exact token matches, non-exact token matches and derive equivalence scores were calculated as follows: Iterating over distance $d_i$, $1 \leq i \leq max$ where $max(|t_{annotated}, t_{rendered}|)$, where each iteration generated a matrix, $m_i$, containing for each metric a vector $m_{i,j}$, $1 \leq i \leq 2$, describing the number of equivalent strings ($m_{i,0}$), nonequivalent strings ($m_{i,1}$), and those strings not evaluated ($m_{i,2}$) at distance $d_i$. Equivalency was defined as the distance equal to the iteration number ($d_i$=i). Token pairs were discarded from evaluation where the string length of the rendered token string is too large or too small compared to the annotated token string length and the distance under evaluation ($|t_{annotated}|>|t_{rendered}|+i$, $|t_{annotated}|<|t_{rendered}|-i$). A stop rule was applied where the number of equivalent strings repeated on the next iteration ($m_{i-1,0}=m_{i,0}$) but the count of non-equivalent string differed ($m_{i-1,1}=m_{i,1}$) for each metric. In the error analysis step, when the resulting non-matched instances satisfying these criteria surpass 20% of all OCR-rendered tokens, they were passed to the OCR reinterpretation module for substitution operation and added to the exact matching string as output.

Evaluate the modified MIRROR EHR version in a new corpus of DXA reports. The VUMC team's image annotation tool can be used to mark bone density scores in DXA reports to develop and measure the performance of the DXA-tuned OCR/NLP system in a set of unseen West Haven DXA reports, inclusive of non-VA reports referred by providers at the Newington facility. The OCR-to-NLP system may target a performance of about 0.80 F-measure in recognizing bone density scores from West Haven.

To train and test the full MIRROR pipeline, once the OCR module has been recalibrated, DXA reports can be sampled from both the West Haven VA facility and from the Newington facility. To ensure that the system is exposed to potential variations in scoring type and document format as a function of device type and report source, the sampling strategy can include an equal number of reports from each site, and within each site, an equal distribution of reports by device type. West Haven subject matter experts can use an image annotation tool provided by the VUMC team to annotate DXA reports with bone density scores. This study may provide the reference standard for both the development dataset and the test dataset.

Depending on the number of DXA device types in use at West Haven and Newington, it was anticipated that no more than 200 (100 from each site) reports for the annotation task may be needed, in addition to the 50 used in the OCR recalibration step. 130 DXA reports are contemplated being used in the training step and 70 to evaluate the performance. Although the OCR performance metrics may be produced, the evaluation may consume the entire system and can be expressed in traditional NLP metrics, precision, recall and f-measure.

Example 6

In an example use of the disclosed method, the study reviews scanned medical records following emergency interhospital transfers and provides estimated efficiency gains.

In Fiscal Year 2021, the VA spent more than $17 billion on non-VA healthcare services. According to the VA OIG, non-VA-to-VA health information exchange is fragile, error-prone, and dependent upon scanned or paper health records. In this study, it is contemplated whether adapting a system using the disclosed method for interpreting imaged text in scanned health records by training it on scanned health records of patients transferred from community facilities in the vicinity of the VA Nashville Tennessee Valley Healthcare System is feasible.

Methods

In a non-VA environment, for the purposes of testing in an environment distinct from the receiving facility (Vanderbilt University Emergency Department), scanned health records of patients transferred from 5 regional healthcare facilities were sampled. The already discussed MIRROR EHR system (see e.g., FIGS. 1 and 2) was used. In this study, MIRROR's ability to recognize medications and associated date-times within the selected imaged health records was evaluated, as compared to human annotation. Additionally, human review time as compared to MIRROR processing time in indexing patient identifying demographic information was reported because collecting and indexing these data is necessary for entering scanned records into the VA's electronic health record.

Results

Time-expenditure by human reviewers indexing patient identifiers of 5 imaged charts (total 130 pages) was 1 hour and 41 minutes, compared to MIRROR's processing time of 6 minutes and 46 seconds.

For assessing MIRROR EHR's performance on clinical content, data identified by MIRROR were considered a match if all text within the annotation's bounding box exactly matched MIRROR's output, a partial match where MIRROR's output in relation to the annotation's bounding box had a Sorensen-dice score of no less than 0.75. Results are shown in Table 7 (FIG. 20) show Medication Name figures followed by Medication Administration Time.

MIRROR EHR partially or exactly matched 92% of information pertinent to determining medication and time of administration from imaged health records. The speed of this system as compared to human review, balanced with its accuracy show that the disclosed method provides significant technical advantages for VA ED healthcare workers managing patients transferred from non-VA settings. It is contemplated that incorporating MIRROR EHR into the information workflow has the potential to improve health information transfer for Veterans transferred into VA medical centers from non-VA facilities by provisioning the ED with a system for delivering timely, pertinent health information from an otherwise inert data-source: paper records and scanned versions of paper records.

Example 7

In an example use of the disclosed method, the method is used to review non-routine events (NRE) in care transitions.

Care transitions are well documented as high-risk processes in healthcare. (Niven D J, Bastos J F, Stelfox H T. Critical care transition programs and the risk of readmission or death after discharge from an ICU: a systematic review and meta-analysis. *Crit Care Med.* 2014; 42(1):179-187; Sauro K M, Soo A, de Grood C, et al. Adverse Events After Transition From ICU to Hospital Ward: A Multicenter Cohort Study. *Crit Care Med.* 2020; 48(7):946-953; Horwitz L I, Moriarty J P, Chen C, et al. Quality of discharge practices and patient understanding at an academic medical center. *Jama Intern Med.* 2013; 173(18):1715-1722; Greenwald J L, Denham C R, Jack B W. The hospital discharge: a review of a high risk care transition with highlights of a reengineered discharge process. *Journal of Patient Safety,* 2007:97406). However, interhospital transfers add yet another layer of complexity to the transition process by requiring two facilities to communicate and coordinate care across time and distance while navigating organizational mismatches in resources, communication standards, and safety culture and processes. These problems are compounded when health information systems do not communicate as in the context of a Veteran presenting to a non-VA facility. Obstacles to care coordination, due to the absence of communication between health information systems have escalated since the passage of the CHOICE and MISSION Acts. Non-VA emergency care and hospitalizations have drastically increased, with non-VA ED visits increasing 11% to 730,000 from FY19-20 with an estimated 20% admission rate accounting for the single highest non-VA care cost ($5.3B in FY21). ((VA) USDoVA, (VHA) VHA. *Care Optimization in the Emergency Department (CO-ED) Guidebook* 2021).

Non-Routine Events (NREs) represent a framework to study the precursors and contributory factors to system failures and adverse events, and is particularly relevant during patient handovers, which are more common when Veterans receive care across both VA and non-VA settings. NREs are deviations from optimal clinical care based on the context of care and can be associated with patient injury or harm. While NREs have been studied commonly in perioperative settings, patient handovers during care transitions that occur in other acute care settings (e.g., ED or Trauma), have received less scrutiny despite similar vulnerabilities.

Increased use of non-VA emergency care further fragments a Veteran's acute care when medical records are not shared. A 2019 VA Office of Inspector General report found that non-VA records lack integration with VA medical record systems. (Department of Veterans Affairs Office of Inspector General. *Improvements Needed in Adding Non-VA Medical Records to Veterans' Electronic Health Records.* 2019). In systems with integrated information sharing via health information exchanges, the seamless sharing of information can improve the timeliness of interhospital transitions and 30-day hospital readmissions for emergency transfers of patients with acute myocardial infarction. (Lu L X, Lu S F. Distance, quality, or relationship? Interhospital transfer of heart attack patients. *Production and Operations Management.* 2018; 27(12):2251-2269). Incomplete or delayed transfer of clinical information (typically delivered via paper records), does not allow the receiving team to develop an accurate shared mental model of the patients' conditions and immediate clinical needs, particularly when immediate intervention is required. Harm occurs in the form of delay in care which worsens clinical outcomes for acute myocardial infarction and stroke patients, (Froehler M T, Saver J L, Zaidat O O, et al. Interhospital Transfer Prior to Thrombectomy is Associated with Delayed Treatment and Worse Outcome in the STRATIS Registry. *Circulation.* 2017; McLane P, Tate K, Reid R C, Rowe B H, Estabrooks C, Cummings G G. Addressing Communication Breakdowns during Emergency Care Transitions of Older Adults: Evaluation of a Standardized Inter-Facility Health Care Communication Form. *Can J Aging.* 2022; 41(1):15-25; Wang T Y, Nallamothu B K, Krumholz H M, et al. Association of door-in to door-out time with reperfusion delays and outcomes among patients transferred for primary percutaneous coronary intervention. *JAMA.* 2011; 305(24):2540-2547) and is associated with clinical deterioration.

Information fragmentation due to the use of non-VA paper records further compromises the ability to identify and prevent NREs. A major gap is how to integrate these paper records that are scanned into VistA. The disclosed method including the MIRROR EHR framework was used in this study. Using stored imaged medical records in VistA, it is contemplated that NREs are identifiable prior to departure from the referring center, and the capture of NREs represents an opportunity for intervention before an adverse event occurs. In this study, the feasibility of NRE data collection in the interhospital setting and the potential for automating the data collection process through MIRROR EHR of care transitions and the integration of Veteran health information was explored. The objectives of the study were to determine the feasibility of collecting data on non-routine events amongst acute interhospital transfers of Veterans, to identify NRE themes in transfer documentation amongst Veterans experiencing interhospital transfer, and to train the disclosed method to collect and categorize data that are indicators of NREs.

Potential sources of NREs in a population of reportedly stable, transferred ED patients (N=60; from VA and non-VAs) directly admitted to a floor bed were categorized. Following transfer, the feasibility of surveying providers and patients/caregivers were evaluated using the validated Comprehensive Open-Ended NRE Survey (CONES) to identify and categorize NREs in a sample of 50% uneventful transfers and 50% unexpected escalations in care (e.g., diversion to the ED, rapid response team activation, transfer to higher level of care, admission to ICU and/or cardiac arrest) during the first 24 hours of the hospital stay.

A retrospective review of clinical documentation of the subjects was conducted and results were compared with prospectively collected NRE identification to assess the availability of transfer documentation and identification of themes of NREs available in transfer documentation.

Using VA and non-VA ED pre-transfer records, the MIRROR (OCR-NLP informatics tool) was trained to identify data that are relevant to NREs during interhospital transfers (e.g., vital signs, sedative medications).

Methods

Using paper interhospital transfer records stored electronically as images in computerized patient record systems (CPRS) when Veterans are transferred from outside of the Tennessee Valley Healthcare System EDs, this study optimizes the use of the MIRROR EHR tool to identify data that are representative of pre-transfer NREs. It is contemplated that NRE components identifiable by MIRROR EHR may include vital signs, laboratory values, medications, mental status evaluation, and respiratory status evaluation, among others.

An annotation process, developed through the creation of MIRROR to construct the reference standard for use in both development and evaluation of NRE category recognition, can be used. A portable document format editor can be used with a customized data-schema to annotate interhospital transfer documents. For example, using sedative and hypnotic medications as a likely component of NREs, first, eligible agents can be identified and annotated based on their use (e.g., benzodiazepines and opioids), their dose, and their route of administration. Then, textual mentions of timestamp (s) associated with these agents can be identified and annotated such as administration time, ordered time, start time, or stop time. The annotation results can then be exported from the portable document format editor and recorded in VA REDCap. This process can be repeated for additional relevant drug classes and other NRE component types that are identified.

In this study, MIRROR can be trained to identify signals that are representative of pre-transfer NREs. Success of the MIRROR tool can be defined as detection of those drug administrations, vital sign abnormalities, mental, and respiratory statuses as well as any other data points within broader categories identified that are representative of NREs and may result in unplanned escalation of care. Additionally, MIRROR can be trained using a development cohort of approximately 15 non-VA interhospital transfer records. With approximately 30 pages each, there were approximately 450 pages in the development cohort. The remaining transfer documentation (approximately 15 non-VA transfer records, 450 pages total) can be used to perform the evaluation step.

It is contemplated that the study can elucidate the agreement between the reference standard annotations of data representative of NREs, serving as ground truth, and MIRROR output from analysis of the validation cohort. Measurements may include precision, recall and f-measure. Secondary outcomes may include analysis of MIRROR output at every step, for instance accuracy of OCR on vital signs, medications, dates, and any other annotated data point; and accuracy of drug/timestamp pairing.

It is contemplated that the disclosed method, as adapted for the study, may encounter limitations including suboptimal images, out of order documentation, or uninterpretable handwriting that will drop out of the system. For received but uninterpretable data, the study can measure this fallout. A prior trial performed with 97% accuracy in recognizing characters within scanned transfer documents. The target sample size is 60 documents from non-VA facilities, which can be supplemented from VA ED/UCCs. While these data were available in CPRS, when Veterans were transferred to non-VA hospitals, these records were printed out as part of an interhospital transfer packet.

The disclosed method as applied in this study represents a major paradigm shift from the existing use of medical records at other medical centers. Rather than using images for individual providers, this system assesses the incoming data from EHR systems at different centers for integration into clinical care, administrative quality assurance, and research. It is contemplated that the disclosed methods as implemented for this study will have broader use beyond transfer patients. The disclosed method as implemented for this study provides a means to overcome information loss due to scanned records as a far-reaching clinical information management function that could have a broad impact on other environments. It is additionally considered that in further iterations of this implemented method, each individual document within the incoming EHR would be categorized and provisioned with sufficient metadata anchors to integrate it into the VA-specific or other provider center domains (e.g., clinical note type, lab value table, and medication list).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method comprising:
    reading a scanned document;
    extracting a page image from the scanned document, wherein the page image includes text and structured data;
    performing optical character recognition (OCR) to convert the text contained in the page image to first text data;
    executing a structured data detection algorithm to detect the structured data contained in the page image, and identify a plurality of elements of the structured data, wherein the step of executing the structured data detection algorithm comprises:
        performing cell boundary detection to identify a plurality of cells within the structured data by transforming the page image to a black and white image;
        detecting a white background within the structured data using a pixel flood process; and
        detecting one or more lines bounding the plurality of cells;
        performing table boundary detection to identify one or more tables within the structured data, wherein each of the one or more tables comprises one or more of the plurality of cells; and
        performing table structure detection to identify a plurality of rows and columns within each of the one or more tables;
    performing OCR to convert respective contents of each of the plurality of elements of the structured data to second text data; and
    executing a natural language processing (NLP) algorithm to retrieve information from the first and second text data.

2. The computer-implemented method of claim 1, further comprising storing the first text data, the second text data, and/or the retrieved information in a database.

3. The computer-implemented method of claim 1, further comprising generating graphical display data comprising the first and second text data, wherein the retrieved information is highlighted within the first and second text data.

4. The computer-implemented method of claim 1, further comprising generating a message comprising the retrieved information.

5. The computer-implemented method of claim 1, wherein the step of performing table boundary detection comprises:
    clustering the plurality of cells into the one or more tables, wherein the plurality of cells are clustered based on respective distances between cells; and
    detecting one or more lines bounding each of the one or more tables.

6. The computer-implemented method of claim 5, wherein the step of performing table structure detection comprises iterating through the plurality of cells of the one or more tables to assign each cell to a respective row and a respective column in a respective table.

7. The computer-implemented method of claim 1, wherein the step of executing the NLP algorithm comprises executing a plurality of NLP algorithms to retrieve information from the first and second text data.

8. The computer-implemented method of claim 7, wherein the plurality of NLP algorithms comprise a first NLP algorithm configured to recognize and encode clinical information contained in the first and second text data and a second NLP algorithm configured to extract temporal information contained in the first and second text data.

9. The computer-implemented method of claim 8, wherein the second NLP algorithm is configured to extract the temporal information related to the clinical information recognized and encoded by the first NLP algorithm.

10. The computer-implemented method of claim 1, wherein the scanned document is a medical record.

11. The computer-implemented method of claim 10, wherein the retrieved information comprises demographic information and clinical information.

12. The computer-implemented method of claim 11, wherein the demographic information and the clinical information comprises an antibiotic and/or induction agent administered to a patient and associated attributes.

13. The computer-implemented method of claim 10, wherein the medical record is a bone density report, and wherein the retrieved information comprises bone density scores and associated attributes.

14. A system comprising:
a processor; and
a memory operably coupled to the processor, the memory having computer-executable instructions stored thereon that when executed by the processor, cause the processor to:
read a scanned document;
extract a page image from the scanned document, wherein the page image includes text and structured data;
convert, using an optical character recognition (OCR) module, the text contained in the page image to first text data;
detect, using a structured data detection module, the structured data contained in the page image;
identify, using the structured data detection module, a plurality of elements of the structured data, wherein the structured data detection module is configured to:
perform cell boundary detection to identify a plurality of cells within the structured data by transforming the page image to a black and white image;
detecting a white background within the structured data using a pixel flood process; and
detect one or more lines bounding the plurality of cells;
perform table boundary detection to identify one or more tables within the structured data, wherein each of the one or more tables comprises one or more of the plurality of cells; and
perform table structure detection to identify a plurality of rows and columns within each of the one or more tables;
convert, using the OCR module, respective contents of each of the plurality of elements of the structured data to second text data; and
retrieve, using a natural language processing (NLP) module, information from the first and second text data.

15. The system of claim 14, wherein the step of performing table boundary detection comprises:
clustering the plurality of cells into the one or more tables, wherein the plurality of cells are clustered based on respective distances between cells; and
detecting one or more lines bounding each of the one or more tables.

16. The system of claim 15, wherein the step of performing table structure detection comprises iterating through the plurality of cells of the one or more tables to assign each cell to a respective row and a respective column in a respective table.

* * * * *